US011758156B2

(12) United States Patent
Yuan

(10) Patent No.: US 11,758,156 B2
(45) Date of Patent: Sep. 12, 2023

(54) BLOCK MODULATING VIDEO AND IMAGE COMPRESSION CODECS, ASSOCIATED METHODS, AND COMPUTER PROGRAM PRODUCTS FOR CARRYING OUT THE SAME

(71) Applicant: Nokia Technologies Oy, Espoo (FI)

(72) Inventor: Xin Yuan, New Providence, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/136,339

(22) Filed: Dec. 29, 2020

(65) Prior Publication Data
US 2022/0210442 A1 Jun. 30, 2022

(51) Int. Cl.
H04N 19/176 (2014.01)
H04N 19/119 (2014.01)
H04N 19/91 (2014.01)
H04N 19/132 (2014.01)
H04N 19/124 (2014.01)

(52) U.S. Cl.
CPC ......... *H04N 19/176* (2014.11); *H04N 19/119* (2014.11); *H04N 19/124* (2014.11); *H04N 19/132* (2014.11); *H04N 19/91* (2014.11)

(58) Field of Classification Search
None
See application file for complete search history.

(56) References Cited

U.S. PATENT DOCUMENTS 10,154,204 B2 12/2018 Yuan et al.
10,200,605 B2 2/2019 Yuan
2014/0254938 A1* 9/2014 Gu ................... H04N 19/895
382/199
2018/0139443 A1* 5/2018 Park ................... H04N 19/11
(Continued)

FOREIGN PATENT DOCUMENTS

WO WO-2012055216 A1 * 5/2012 ........... H04N 19/40
WO 2019/185992 A1 10/2019

OTHER PUBLICATIONS

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
(Continued)

*Primary Examiner* — Lindsay J Uhl
(74) *Attorney, Agent, or Firm* — ALSTON & BIRD LLP

(57) ABSTRACT

Described are a method, apparatus and computer program product are provided for block modulating video and image compression. Different masks may be imposed on different blocks of an image and then the blocks summed to one block. In some embodiments, an encoder complexity of the encoder may be O(1). A method can be carried out that includes dividing an input image into a plurality of blocks; assigning different masks to each respective image block of the plurality of image blocks, the different masks having a size equal to that of each respective image block of the plurality of image blocks; modulating each respective image block of the plurality of blocks the assigned different masks to generate a plurality of modulated image blocks; summing the modulated plurality of blocks to at least one summed block; and quantizing the at least one summed block.

21 Claims, 22 Drawing Sheets

(56) References Cited

U.S. PATENT DOCUMENTS

| | | | |
|---|---|---|---|
| 2018/0295400 A1* | 10/2018 | Thomas ............... | H04N 19/167 |
| 2019/0141331 A1* | 5/2019 | Schulze ............... | H04N 19/182 |
| 2020/0275105 A1* | 8/2020 | Zhao .................... | H04N 19/149 |

OTHER PUBLICATIONS

"Advanced Video Coding for Generic Audiovisual services", Series H: Audiovisual and Multimedia Systems, Infrastructure of audiovisual services—Coding of moving Video, Recommendation ITU-T H.264, Jun. 2019, 836 pages.

"High Efficiency Video Coding", Series H: Audiovisual and Multimedia Systems, Infrastructure of audiovisual services—Coding of moving video, Recommendation ITU-T H.265, Nov. 2019, 712 pages.

"Quantize", MathWorks, Retrieved on Jan. 5, 2021, Webpage available at : https://www.mathworks.com/help/fixedpoint/ref/quantize.html.

"Source Coding", MathWorks, Retrieved on Jan. 5, 2021, Webpage available at : https://www.mathworks.com/help/comm/ug/arithmetic-coding-1.html.

"liuyang12 / PnP-SCI", GitHub, Retrieved on Jan. 5, 2021, Webpage available at : https://github.com/liuyang12/PnP-SCI.

"Mq0829 / DL-CACTI", GitHub, Retrieved on Jan. 5, 2021, Webpage available at : https://github.com/mq0829/DL-CACTI.

Yuan et al., "Plug-and-Play Algorithms for Large-Scale Snapshot Compressive Imaging", IEEE/CVF Conference on Computer Vision and Pattern Recognition (CVPR), Jun. 13-19, 2020, pp. 1444-1454.

Qiao et al., "Deep Learning for Video Compressive Sensing", APL Photonics, vol. 5, Mar. 6, 2020, pp. 030801-1-030801-14.

"UVG Dataset", Ultra Video Group, Retrieved on Jan. 5, 2021, Webpage available at : http://ultravideo.cs.tut.fi/.

Mercat et al., "UVG Dataset: 50/120fps 4K Sequences for Video Codec Analysis and Development", Proceedings of the 11th ACM Multimedia Systems Conference, May 2020, pp. 297-302.

\* cited by examiner

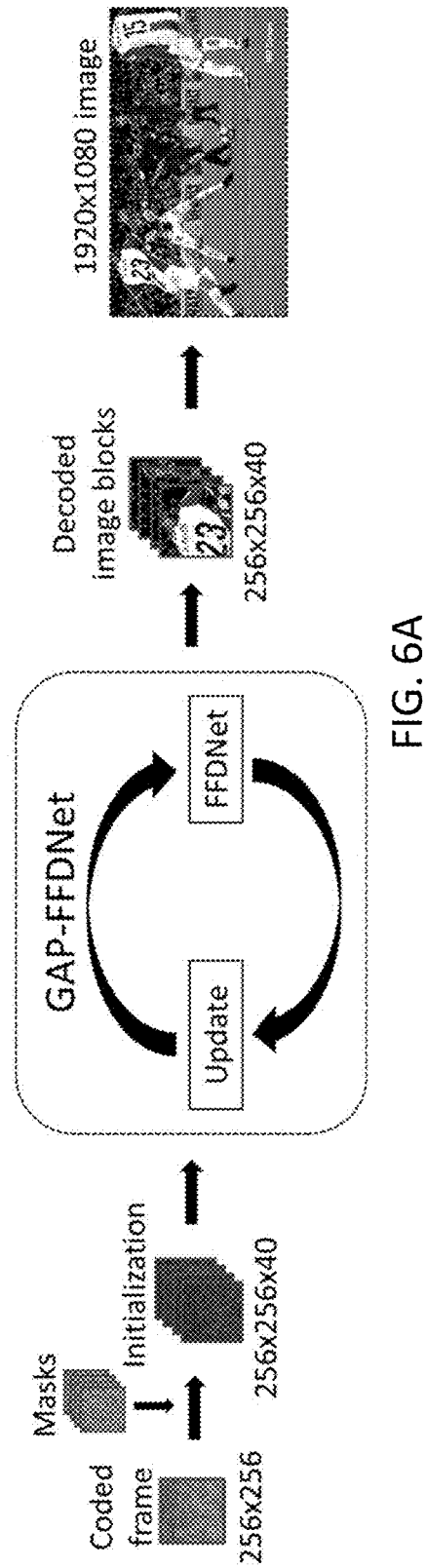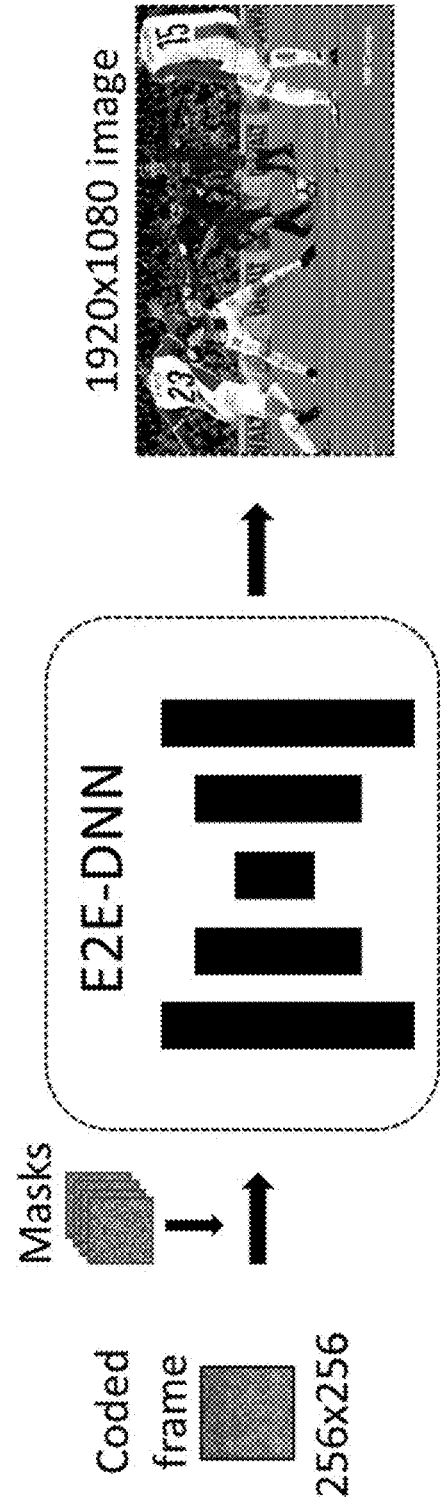
FIG. 6A
FIG. 6B

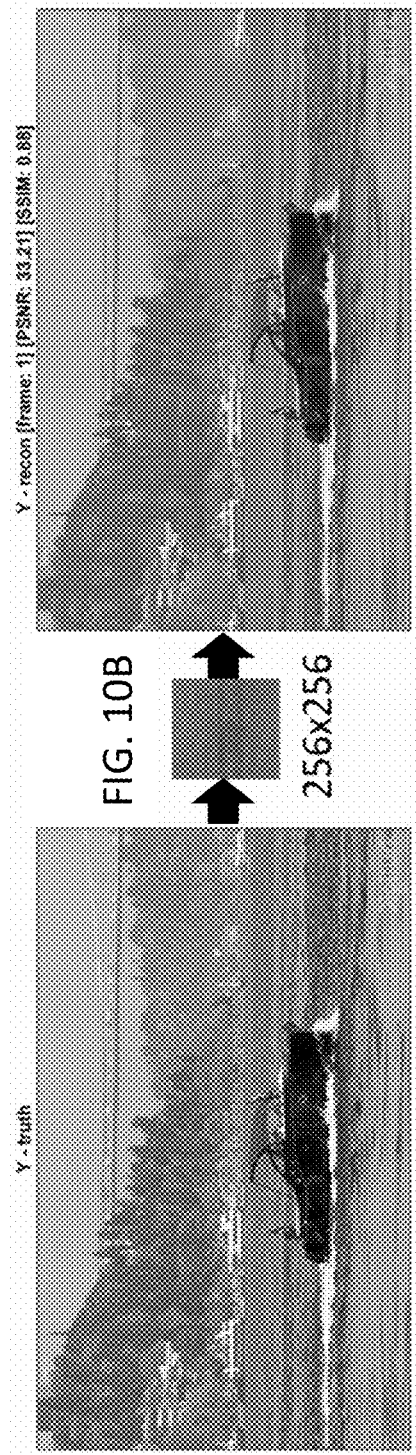

BLOCK MODULATING VIDEO AND IMAGE COMPRESSION CODECS, ASSOCIATED METHODS, AND COMPUTER PROGRAM PRODUCTS FOR CARRYING OUT THE SAME

TECHNOLOGICAL FIELD

An example embodiment relates to video and image compression coder-decoders and, more particularly, to block modulating video and image compression coder-decoders.

BACKGROUND

Video and image compression coder-decoders (codecs) are devices or computer programs that encode and/or decode, e.g., a digital data stream, bitstream, sequence of pictures, a signal, or the like, related to video and/or images. Still image codecs can comport with standards such as JPEG, GIF, PNG, or the like. Video codecs can comport with standards such as Cinepak, MPEG, MPEG-2, H.264, VP8, H.265, or the like.

Existing image and video codecs may provide high-quality video but require high computation complexity and thus high power consumption. However, many mobile devices operate with limited computational capacity and/or limited power capacity (e.g., finite battery life). For these devices, existing codecs are typically ill suited. Instead, for many such mobile devices, the computational complexity of video and image compression is often accomplished by using increasingly lossy codecs, which results in material quality loss once decoded for playback.

SUMMARY

A method, apparatus and computer program product are provided for block modulating video and image compression. According to some embodiments, different masks are imposed to different blocks of an image and then the blocks are summed to a small block, allowing for low-complexity image/video compression encoding that can be implemented on mobile platforms with limited power and limited computational resources.

In some embodiments, the apparatus may comprise a block modulating video and image compression (BMVC) encoder. In some embodiments, an encoder complexity of the BMVC encoder may be O(1).

According to an embodiment, a method can be carried out, e.g., by a processor and a memory storing computer program code. In some embodiments, the method can comprise: dividing an input image into a plurality of image blocks; assigning different masks to each respective image block of the plurality of image blocks, the different masks having a size equal to that of each respective image block of the plurality of image blocks; modulating each respective image block of the plurality of image blocks by the assigned different masks to generate a plurality of modulated image blocks; summing the plurality of modulated image blocks to generate at least one summed block; and quantizing the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the method can further comprise: entropy coding the encoded image to form a bit stream; and transmitting the bit stream.

In some embodiments, the method can further comprise: determining one or more pixels that overlap two or more blocks of the plurality of blocks; and averaging the respective indices of said two or more blocks.

In some embodiments, the method can further comprise: storing indices of each of said two or more blocks of the plurality of blocks to be transmitted with said encoded image.

In some embodiments, the modulating is carried out by determining an element-wise product of a pixel value and a mask value at each corresponding pixel position of the different mask associated with each respective image block of the input image.

In some embodiments, said summing may comprise summing the plurality of modulated image blocks to generate the one or more summed block while disregarding pixels having an element-wise product value of 0.

According to an embodiment, a method can be carried out, e.g., by a processor and a memory storing computer program code, the method comprising: providing an input image and a mask, the input image and the mask having a same size, each pixel of a plurality of pixels of the input image corresponding to an associated pixel position on the mask, each pixel having a pixel value and each associated pixel position on the masks having a mask value; modulating the input image by determining element-wise products of the pixel values associated with each pixel of the input image and the corresponding mask values of each associated pixel position on the mask; dividing the modulated input image into a plurality of image blocks, each image block of the plurality of image blocks corresponding to an associated element-wise product; summing the element-wise products of the pixel values and mask values associated with each image block of the plurality of image blocks to generate at least one summed block; and quantizing the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the method may further comprise: entropy coding the encoded image to form a bit stream; and transmitting the bit stream.

In some embodiments, the method may further comprise: determining one or more pixels that overlap two or more blocks of the plurality of blocks; and averaging the respective indices of said two or more blocks.

In some embodiments, the method may further comprise: storing indices of each of said two or more blocks of the plurality of blocks to be transmitted with said encoded image.

In some embodiments, said summing comprises summing the plurality of image blocks of the modulated input image to generate the one or more summed blocks while disregarding pixels having an element-wise product value of 0.

According to another embodiment, an apparatus can be provided that comprises a processor and a memory storing computer program instructions, wherein the processor is configured, with the memory storing computer program instructions, to: divide an input image into a plurality of image blocks; assign different masks to each respective image block of the plurality of image blocks, the different masks having a size equal to that of each respective image block of the plurality of image blocks; modulate each respective image block of the plurality of image blocks by the assigned different masks to generate a plurality of modulated image blocks; sum the plurality of modulated image blocks to generate at least one summed block; and quantize the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the processor is further configured, with the memory storing computer program instructions, to: entropy code the encoded image to form a bit stream; and transmit the bit stream.

In some embodiments, the processor is further configured, with the memory storing computer program instructions, to: determine one or more pixels that overlap two or more blocks of the plurality of blocks; and average the element-wise products of said two or more blocks for said one or more pixels.

In some embodiments, the processor is further configured, with the memory storing computer program instructions, to: store indices of each of said two or more blocks of the plurality of blocks to be transmitted with said encoded image.

In some embodiments, the modulation is carried out by determining an element-wise product of a pixel value and a mask value at each corresponding pixel position of the different mask associated with each respective image block of the input image.

In some embodiments, the processor is further configured, with the memory storing computer program instructions, to: sum the plurality of modulated image blocks to generate the one or more summed block while disregarding pixels having an element-wise product value of 0.

In some embodiments, the apparatus comprises an encoder having an encoder complexity of O(1).

According to another embodiment, an apparatus can be provided that comprises a processor and a memory storing computer program instructions, wherein the processor is configured, with the memory storing computer program instructions, to: provide an input image and a mask, the input image and the mask having a same size, each pixel of a plurality of pixels of the input image corresponding to an associated pixel position on the mask, each pixel having a pixel value and each associated pixel position on the masks having a mask value; modulate the input image by determining element-wise products of the pixel values associated with each pixel of the input image and the corresponding mask values of each associated pixel position on the mask; divide the modulated input image into a plurality of image blocks, each image block of the plurality of image blocks corresponding to an associated element-wise product; sum the element-wise products of the pixel values and the mask values associated with each image block of the plurality of image blocks to generate at least one summed block; and quantize the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the processor is further configured, with the memory storing computer program instructions, to: entropy code the encoded image to form a bit stream; and transmit the bit stream.

In some embodiments, the processor is further configured, with the memory storing computer program instructions, to: determine one or more pixels that overlap two or more blocks of the plurality of blocks; and average the element-wise product of said two or more blocks.

In some embodiments, the processor is further configured, with the memory storing computer program instructions, to: store indices of each of said two or more blocks of the plurality of blocks to be transmitted with said encoded image.

In some embodiments, the processor is further configured, with the memory storing computer program instructions, to: sum the plurality of image blocks of the modulated input image to generate the one or more summed blocks while disregarding pixels having an element-wise product value of 0.

In some embodiments, the apparatus comprises an encoder having an encoder complexity of O(1).

According to some embodiments, an apparatus can be provided that comprises means, e.g., a processor and a memory storing computer program code, for dividing an input image into a plurality of image blocks; means for assigning different masks to each respective image block of the plurality of image blocks, the different masks having a size equal to that of each respective image block of the plurality of image blocks; means for modulating each respective image block of the plurality of image blocks by the assigned different masks to generate a plurality of modulated image blocks; means for summing the plurality of modulated image blocks to generate at least one summed block; and means for quantizing the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the apparatus can further comprise: means for entropy coding the encoded image to form a bit stream; and transmitting the bit stream.

In some embodiments, the apparatus can further comprise: means for determining one or more pixels that overlap two or more blocks of the plurality of blocks; and averaging the respective indices of said two or more blocks.

In some embodiments, the apparatus can further comprise: means for storing indices of each of said two or more blocks of the plurality of blocks to be transmitted with said encoded image.

In some embodiments, the means for modulating may comprise means for determining an element-wise product of a pixel value and a mask value at each corresponding pixel position of the different mask associated with each respective image block of the input image.

In some embodiments, said means for summing may comprise means for summing the plurality of modulated image blocks to generate the one or more summed block while disregarding pixels having an element-wise product value of 0.

According to an embodiment, an apparatus can be provided that comprises means, e.g., a processor and a memory storing computer program code, for providing an input image and a mask, the input image and the mask having a same size, each pixel of a plurality of pixels of the input image corresponding to an associated pixel position on the mask, each pixel having a pixel value and each associated pixel position on the masks having a mask value; means for modulating the input image by determining element-wise products of the pixel values associated with each pixel of the input image and the corresponding mask values of each associated pixel position on the mask; means for dividing the modulated input image into a plurality of image blocks, each image block of the plurality of image blocks corresponding to an associated element-wise product; means for summing the element-wise products of the pixel values and mask values associated with each image block of the plurality of image blocks to generate at least one summed block; and means for quantizing the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the apparatus may further comprise: means for entropy coding the encoded image to form a bit stream; and transmitting the bit stream.

In some embodiments, the apparatus may further comprise: means for determining one or more pixels that overlap two or more blocks of the plurality of blocks; and averaging the respective indices of said two or more blocks.

In some embodiments, the apparatus may further comprise: means for storing indices of each of said two or more blocks of the plurality of blocks to be transmitted with said encoded image.

In some embodiments, said means for summing may comprise means for summing the plurality of image blocks of the modulated input image to generate the one or more summed blocks while disregarding pixels having an element-wise product value of 0.

According to another embodiment, a computer program product comprising non-transitory computer readable media, may be provided that comprises computer-readable instructions to: divide an input image into a plurality of image blocks; assign different masks to each respective image block of the plurality of image blocks, the different masks having a size equal to that of each respective image block of the plurality of image blocks; modulate each respective image block of the plurality of image blocks by the assigned different masks to generate a plurality of modulated image blocks; sum the plurality of modulated image blocks to generate at least one summed block; and quantize the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the computer program product may further comprise computer-readable instructions to: entropy code the encoded image to form a bit stream; and transmit the bit stream.

In some embodiments, the computer program product may further comprise computer-readable instructions to: determine one or more pixels that overlap two or more blocks of the plurality of blocks; and average the element-wise products of said two or more blocks for said one or more pixels.

In some embodiments, the computer program product may further comprise computer-readable instructions to: store indices of each of said two or more blocks of the plurality of blocks to be transmitted with said encoded image.

In some embodiments, the modulation is carried out by determining an element-wise product of a pixel value and a mask value at each corresponding pixel position of the different mask associated with each respective image block of the input image.

In some embodiments, the computer program product may further comprise computer-readable instructions to: sum the plurality of modulated image blocks to generate the one or more summed block while disregarding pixels having an element-wise product value of 0.

According to another embodiment, a computer program product comprising non-transitory computer readable media, may be provided that comprises computer-readable instructions to: provide an input image and a mask, the input image and the mask having a same size, each pixel of a plurality of pixels of the input image corresponding to an associated pixel position on the mask, each pixel having a pixel value and each associated pixel position on the masks having a mask value; modulate the input image by determining element-wise products of the pixel values associated with each pixel of the input image and the corresponding mask values of each associated pixel position on the mask; divide the modulated input image into a plurality of image blocks, each image block of the plurality of image blocks corresponding to an associated element-wise product; sum the element-wise products of the pixel values and the mask values associated with each image block of the plurality of image blocks to generate at least one summed block; and quantize the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the computer program product may further comprise computer-readable instructions to: entropy code the encoded image to form a bit stream; and transmit the bit stream.

In some embodiments, the computer program product may further comprise computer-readable instructions to: determine one or more pixels that overlap two or more blocks of the plurality of blocks; and average the element-wise product of said two or more blocks.

In some embodiments, the computer program product may further comprise computer-readable instructions to:

store indices of each of said two or more blocks of the plurality of blocks to be transmitted with said encoded image.

In some embodiments, the computer program product may further comprise computer-readable instructions to: sum the plurality of image blocks of the modulated input image to generate the one or more summed blocks while disregarding pixels having an element-wise product value of 0.

In some embodiments, a method can be carried out comprising: dividing an input image into a plurality of blocks; modulating the plurality of blocks by respective different binary random masks; summing the modulated plurality of blocks to one or more summed blocks; and quantizing the one or more summed blocks. In some embodiments, the method can further comprise data compressing the quantized one or more summed blocks to form a bit stream; and transmitting the bit stream.

In some embodiments, a method can be carried out that comprises dividing an input image into a plurality of image blocks; modulating each image block of the plurality of image blocks by determining element-wise products of pixels of each image block and a respective binary random mask; summing the plurality of modulated image blocks to generate one or more summed blocks; and quantizing the one or more summed blocks to form an encoded image.

In some embodiments, the method can further comprise entropy coding the encoded image to form a bit stream; and transmitting the bit stream.

In some embodiments, the method can further comprise determining one or more pixels that overlap two or more blocks of the plurality of blocks; and averaging the respective indices of said two or more blocks.

In some embodiments, the method can further comprise storing indices of each of said two or more blocks of the plurality of blocks to be transmitted with said encoded image.

In some embodiments, the element-wise products of the plurality of image blocks and the respective binary random masks comprise a 1 or a 0 for each pixel of the input image.

In some embodiments, said summing comprises summing the plurality of modulated image blocks to generate the one or more summed block while disregarding pixels having an element-wise product value of 0.

According to another embodiment, a method can be carried out that comprises: modulating an input image by determining an element-wise product of pixels of the input image and corresponding portions of a binary random mask, the binary random mask having dimensions equal to that of the input image; dividing the modulated input image into a plurality of image blocks; summing the plurality of image blocks of the modulated input image to generate one or more summed blocks; and quantizing the one or more summed blocks to form an encoded image.

In some embodiments, the method can further comprise entropy coding the encoded image to form a bit stream; and transmitting the bit stream.

In some embodiments, the method can further comprise determining one or more pixels that overlap two or more blocks of the plurality of blocks; and averaging the respective indices of said two or more blocks.

In some embodiments, the method can further comprise storing indices of each of said two or more blocks of the plurality of blocks to be transmitted with said encoded image.

In some embodiments, the element-wise product of the input image and the binary random mask comprises a 1 or a 0 for each pixel of the input image.

In some embodiments, said summing comprises summing the plurality of image blocks of the modulated input image to generate the one or more summed blocks while disregarding pixels having an element-wise product value of 0.

According to another embodiment, an apparatus can be provided that comprises a processor and a memory storing computer program instructions, wherein the processor is configured, with the memory storing computer program instructions, to: divide an input image into a plurality of image blocks; modulate each image block of the plurality of image blocks by determining element-wise products of pixels of each image block and a respective binary random mask; sum the plurality of modulated image blocks to generate one or more summed blocks; and quantize the one or more summed blocks to form an encoded image.

In some embodiments, the processor can be further configured, with the memory storing computer program instructions, to: entropy code the encoded image to form a bit stream; and transmit the bit stream.

In some embodiments, the processor can be further configured, with the memory storing computer program instructions, to: determine one or more pixels that overlap two or more blocks of the plurality of blocks; and average the element-wise products of said two or more blocks for said one or more pixels.

In some embodiments, the processor can be further configured, with the memory storing computer program instructions, to: store indices of each of said two or more blocks of the plurality of blocks to be transmitted with said encoded image.

In some embodiments, the element-wise products of the plurality of image blocks and the respective binary random masks comprise a 1 or a 0 for each pixel of the input image.

In some embodiments, the processor can be further configured, with the memory storing computer program instructions, to: sum the plurality of modulated image blocks to generate the one or more summed block while disregarding pixels having an element-wise product value of 0.

In some embodiments, the apparatus may comprise a block modulating video and image compression (BMVC) encoder. In some embodiments, an encoder complexity of the BMVC encoder may be O(1).

According to another embodiment, an apparatus can be provided that comprises a processor and a memory storing computer program instructions, wherein the processor is configured, with the memory storing computer program instructions, to: modulate an input image by determining an element-wise product of pixels of the input image and corresponding portions of a binary random mask, the binary random mask having dimensions equal to that of the input image; divide the modulated input image into a plurality of image blocks; sum the plurality of image blocks of the modulated input image to generate one or more summed blocks; and quantize the one or more summed blocks to form an encoded image.

In some embodiments, the processor may be further configured, with the memory storing computer program instructions, to: entropy code the encoded image to form a bit stream; and transmit the bit stream.

In some embodiments, the processor may be further configured, with the memory storing computer program instructions, to: determine one or more pixels that overlap two or more blocks of the plurality of blocks; and average the element-wise product of said two or more blocks.

In some embodiments, the processor may be further configured, with the memory storing computer program instructions, to: store indices of each of said two or more blocks of the plurality of blocks to be transmitted with said encoded image.

In some embodiments, the element-wise product of the input image and the binary random mask comprises a 1 or a 0 for each pixel of the input image.

In some embodiments, the processor may be further configured, with the memory storing computer program instructions, to: sum the plurality of image blocks of the modulated input image to generate the one or more summed blocks while disregarding pixels having an element-wise product value of 0.

In some embodiments, the apparatus may comprise a block modulating video and image compression (BMVC) encoder. In some embodiments, an encoder complexity of the BMVC encoder may be O(1).

BRIEF SUMMARY OF THE DRAWINGS

Figure 1:
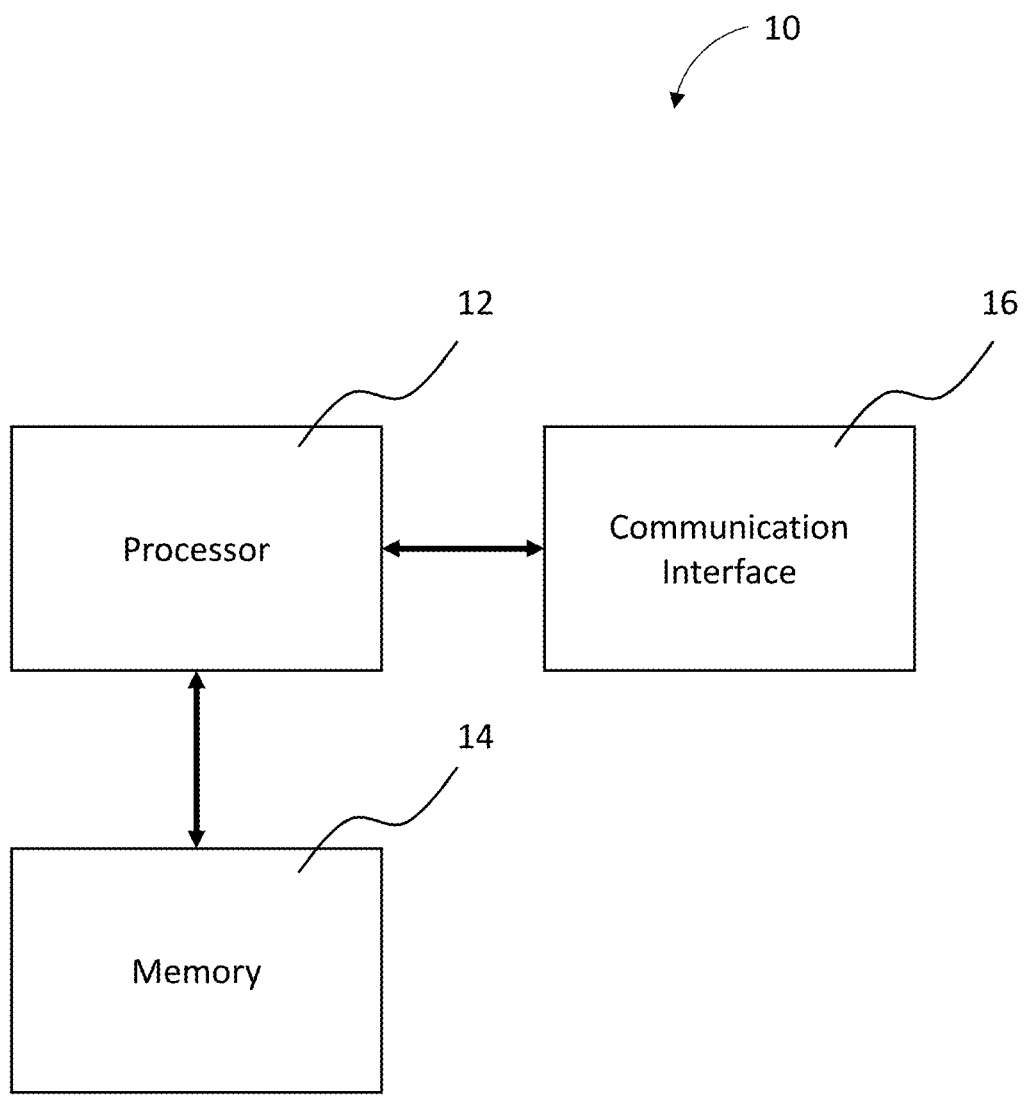
Figure 2:
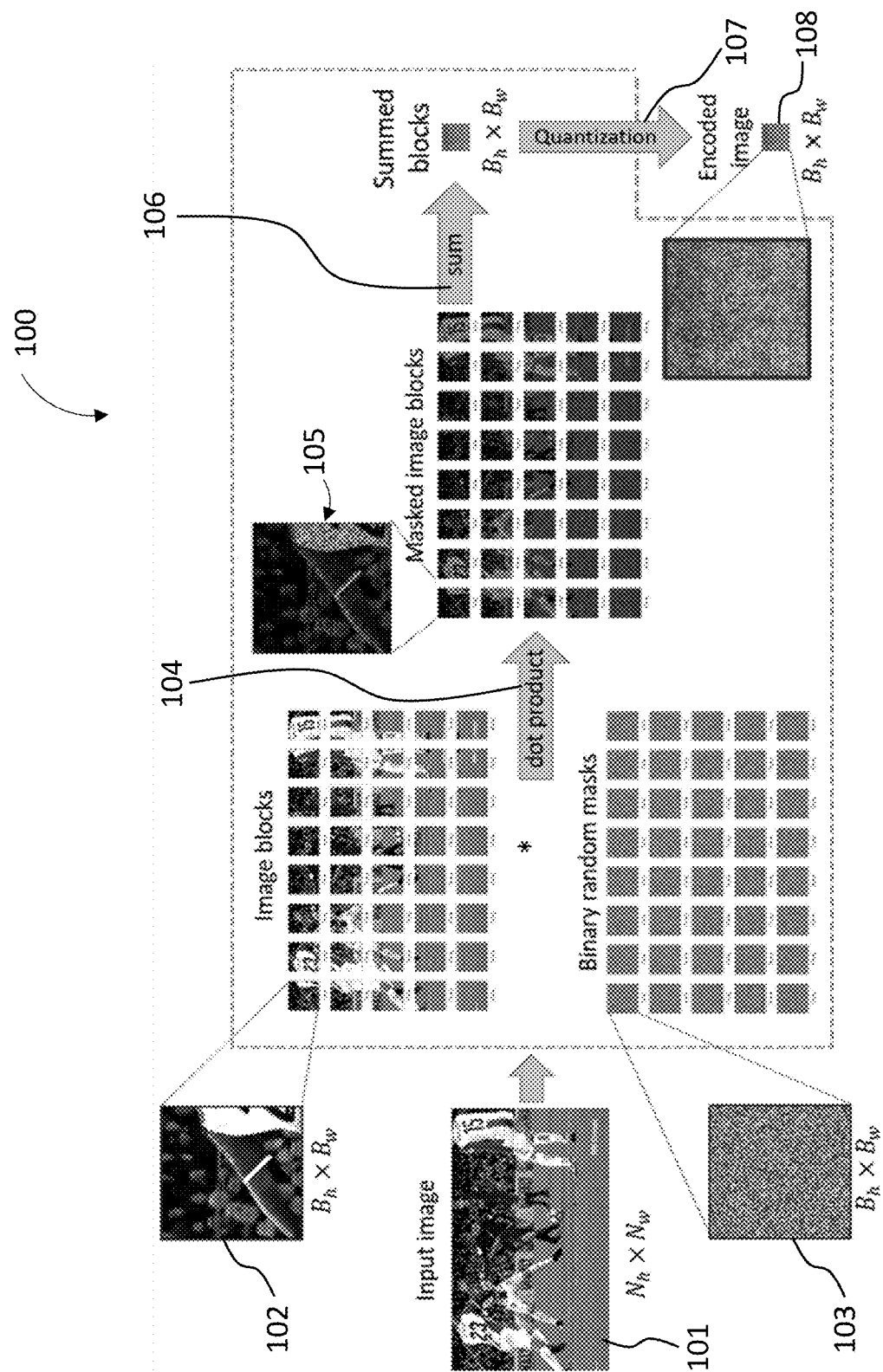
Figure 3:
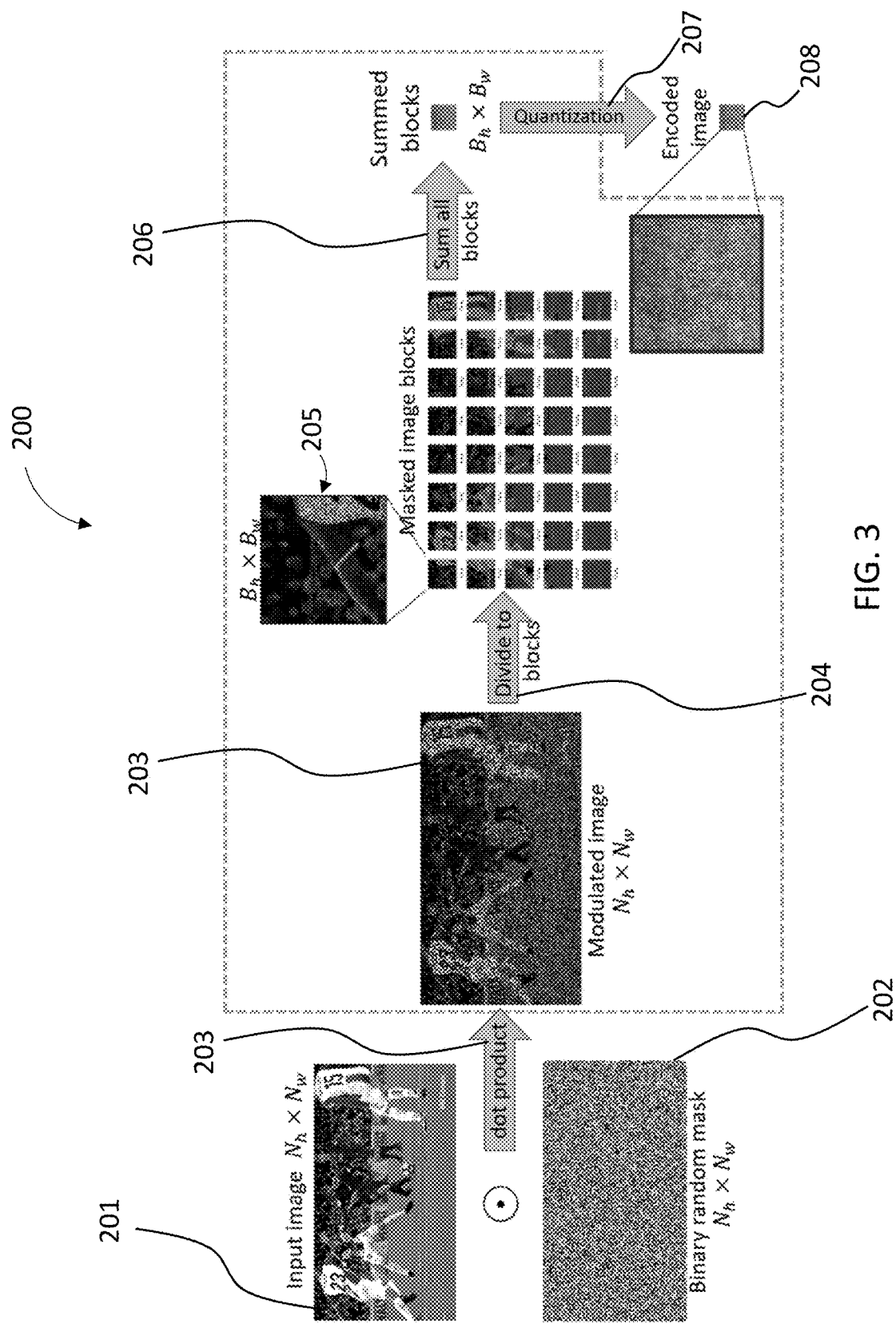
Figure 4:
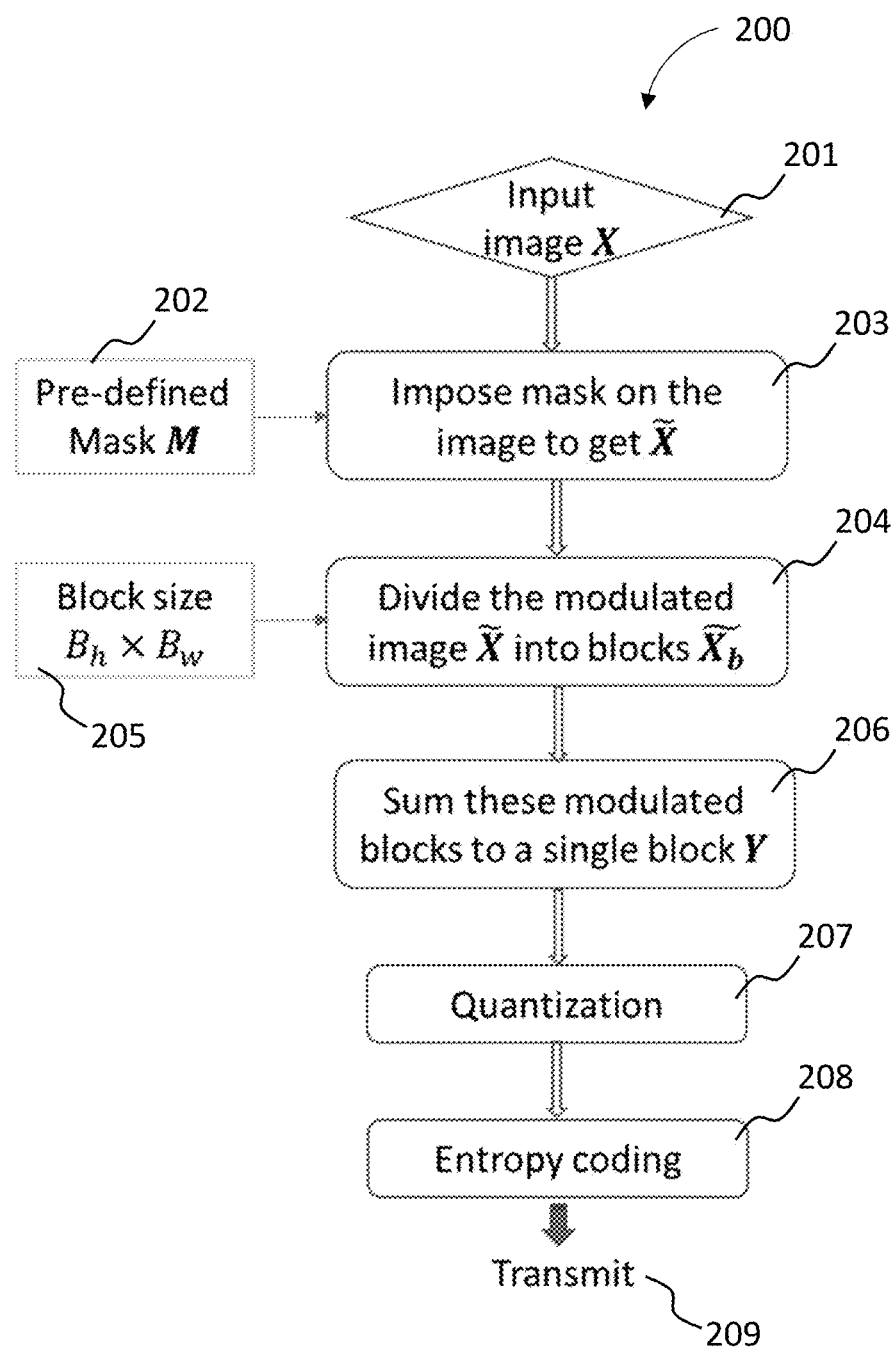
Figure 5:
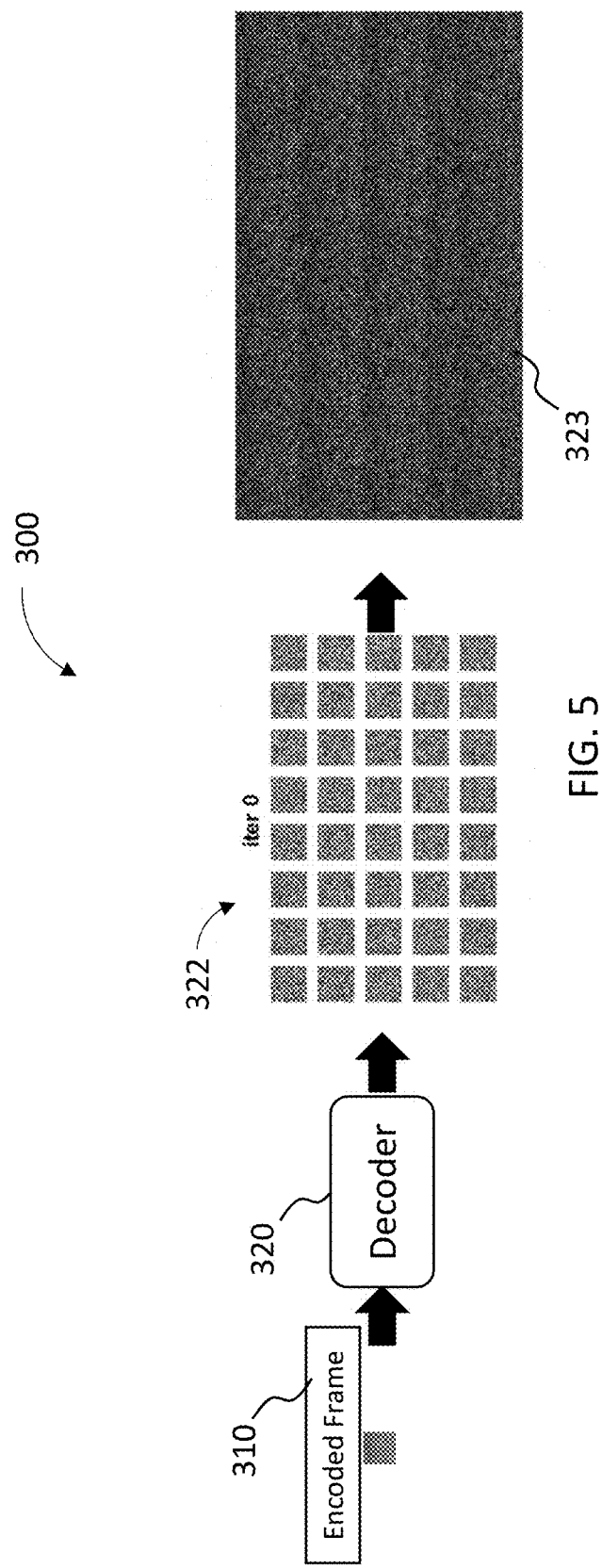
Figure 7:
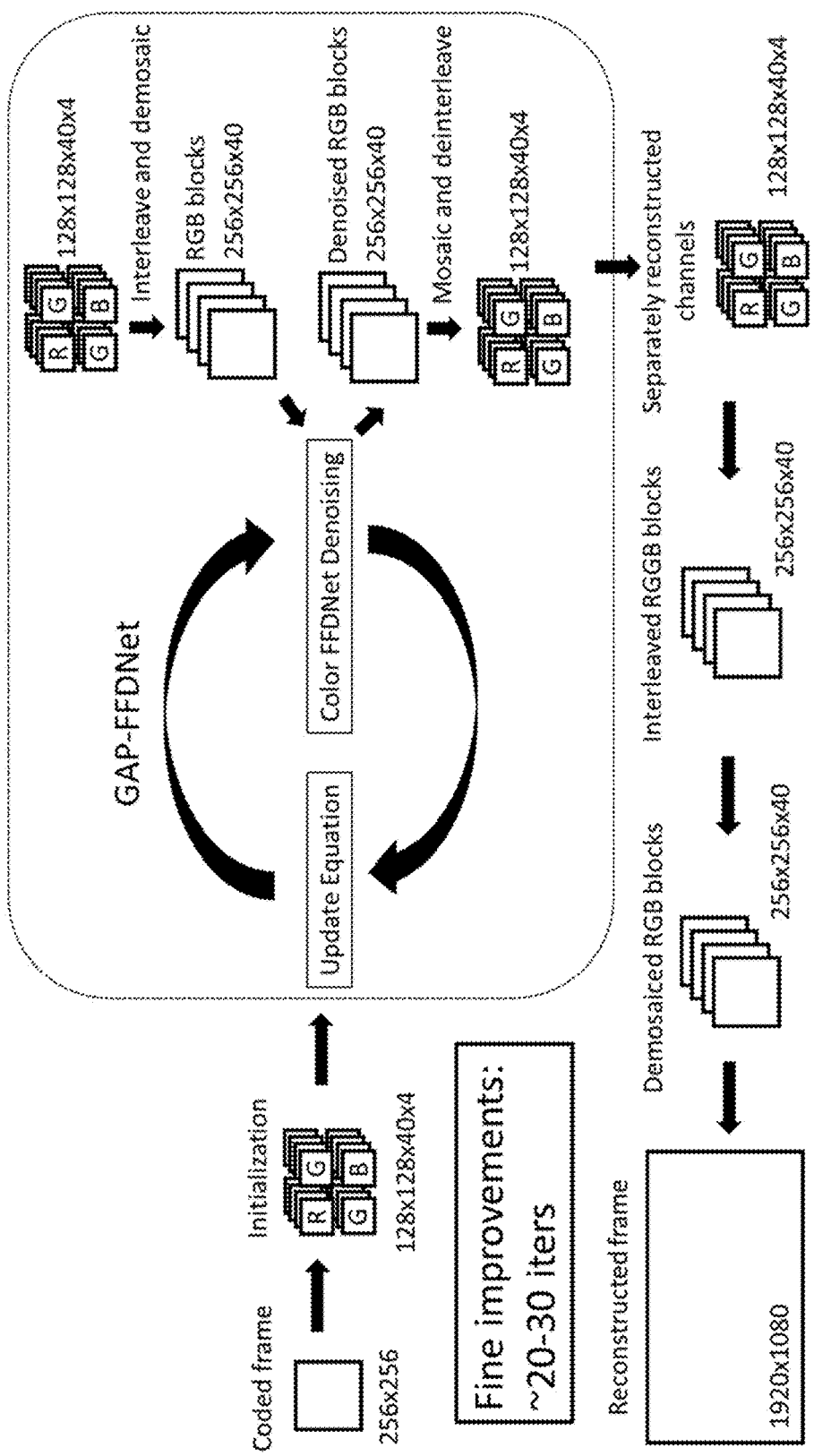
Figures 8A, 8B, 8C:
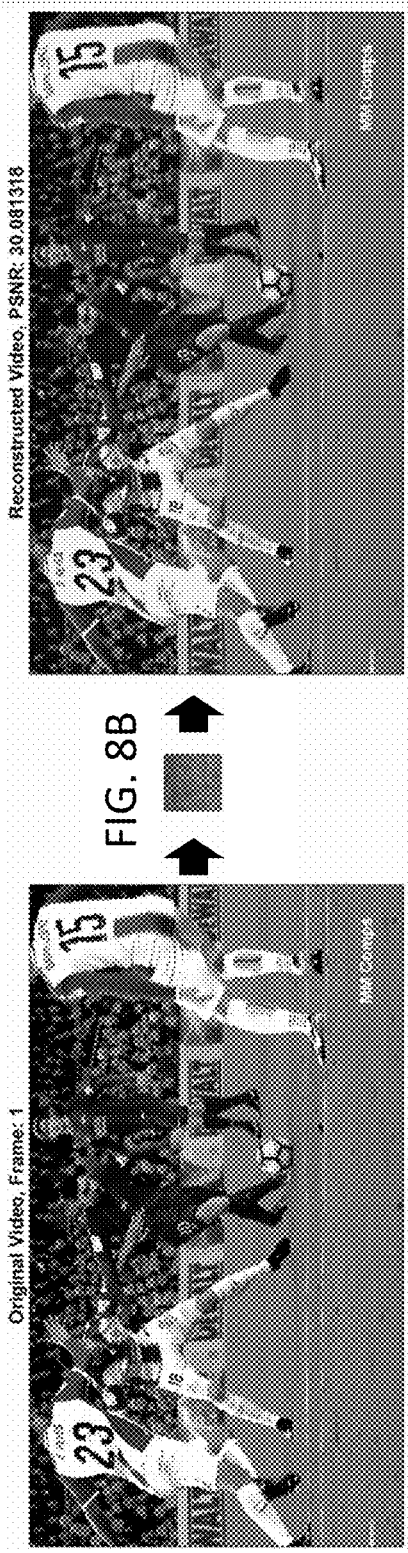
Figures 9A, 9B, 9C:
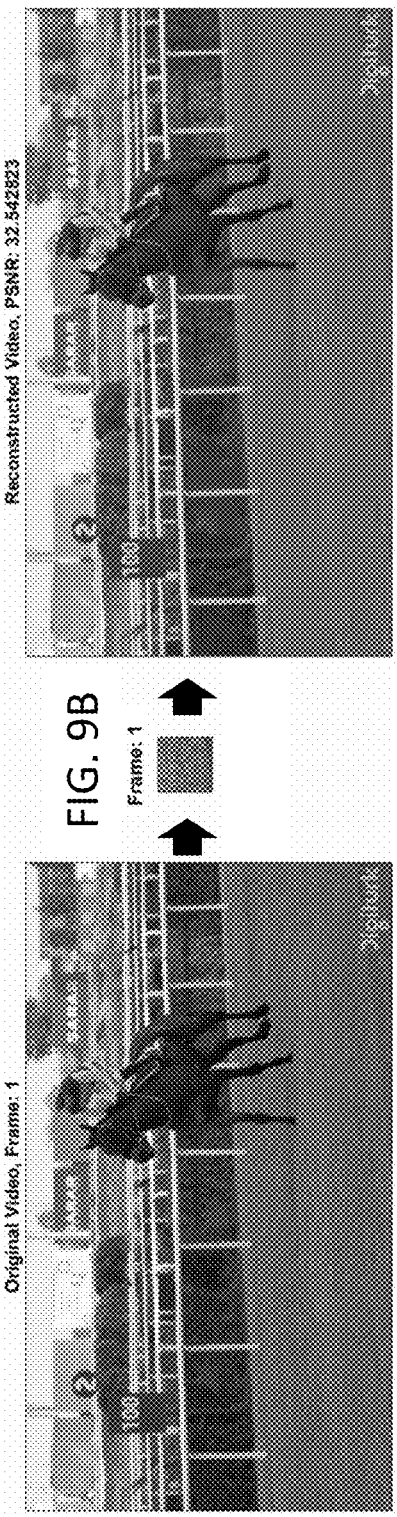
Figures 11A, 11B, 11C:
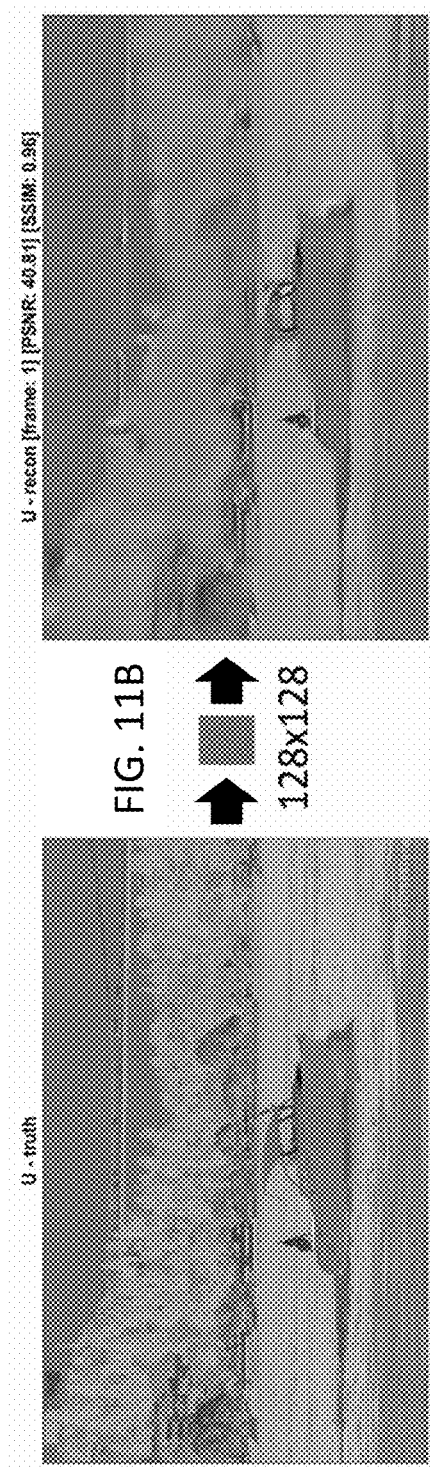
Figures 12A, 12B, 12C:
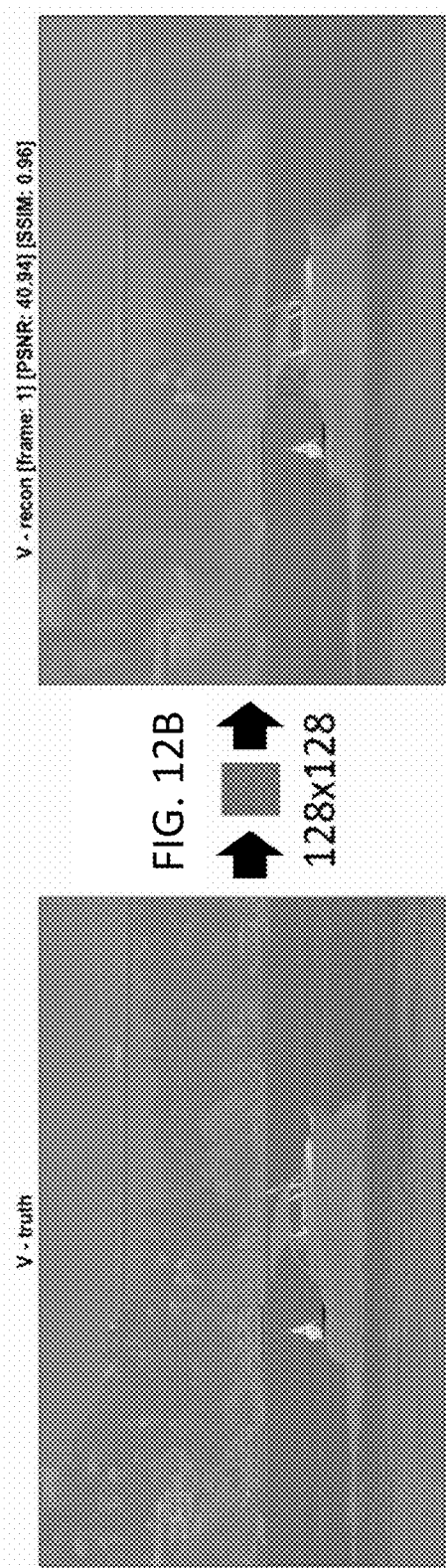
Figure 13B:
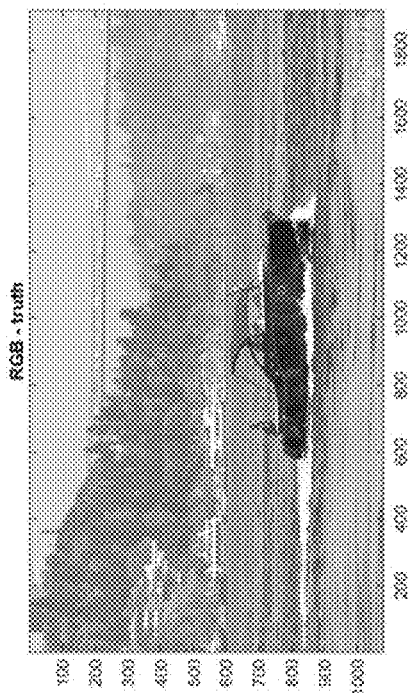
Figure 13A:
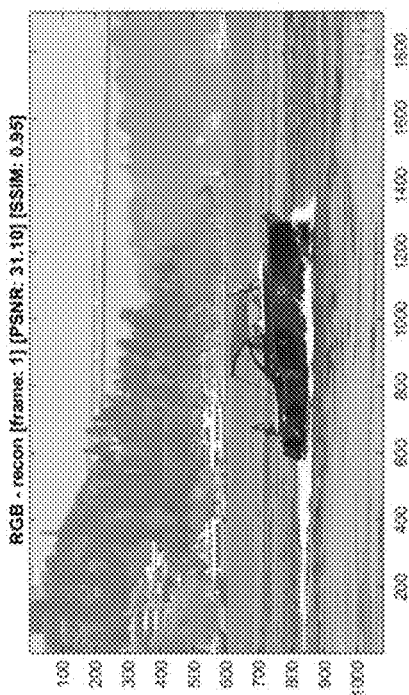
Figure 14:
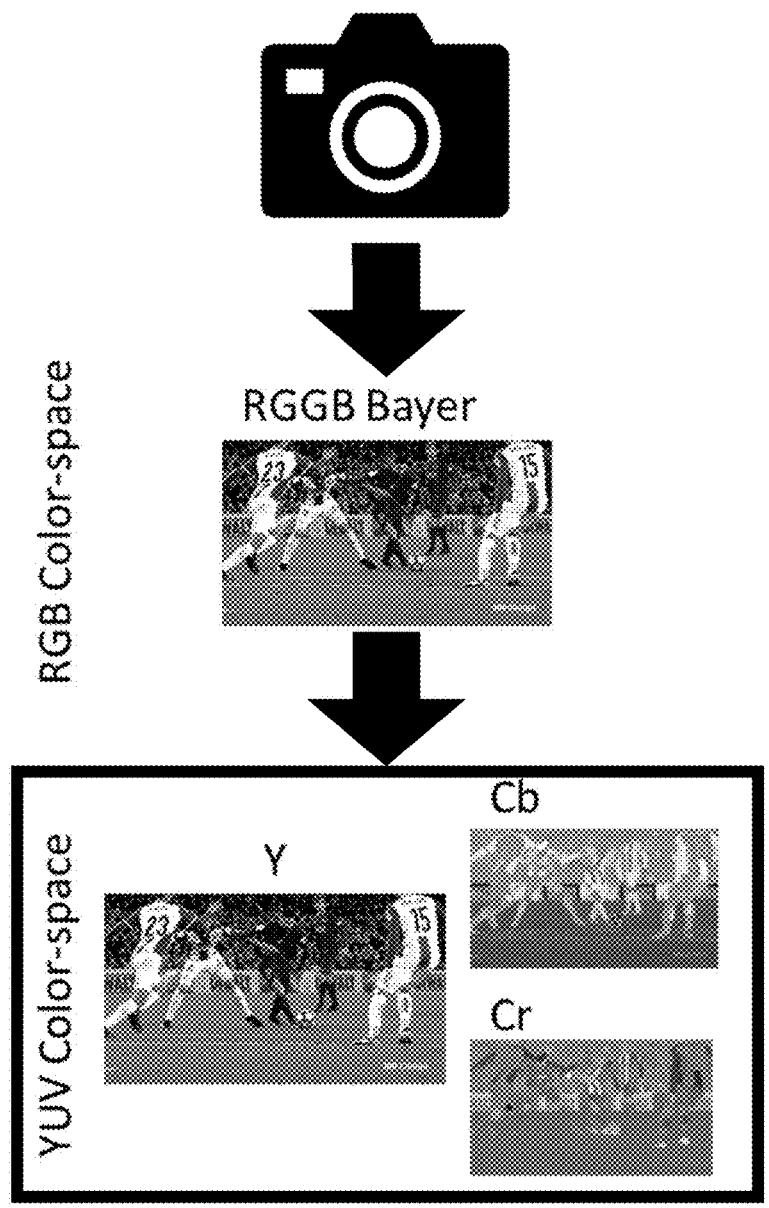
Figure 15:
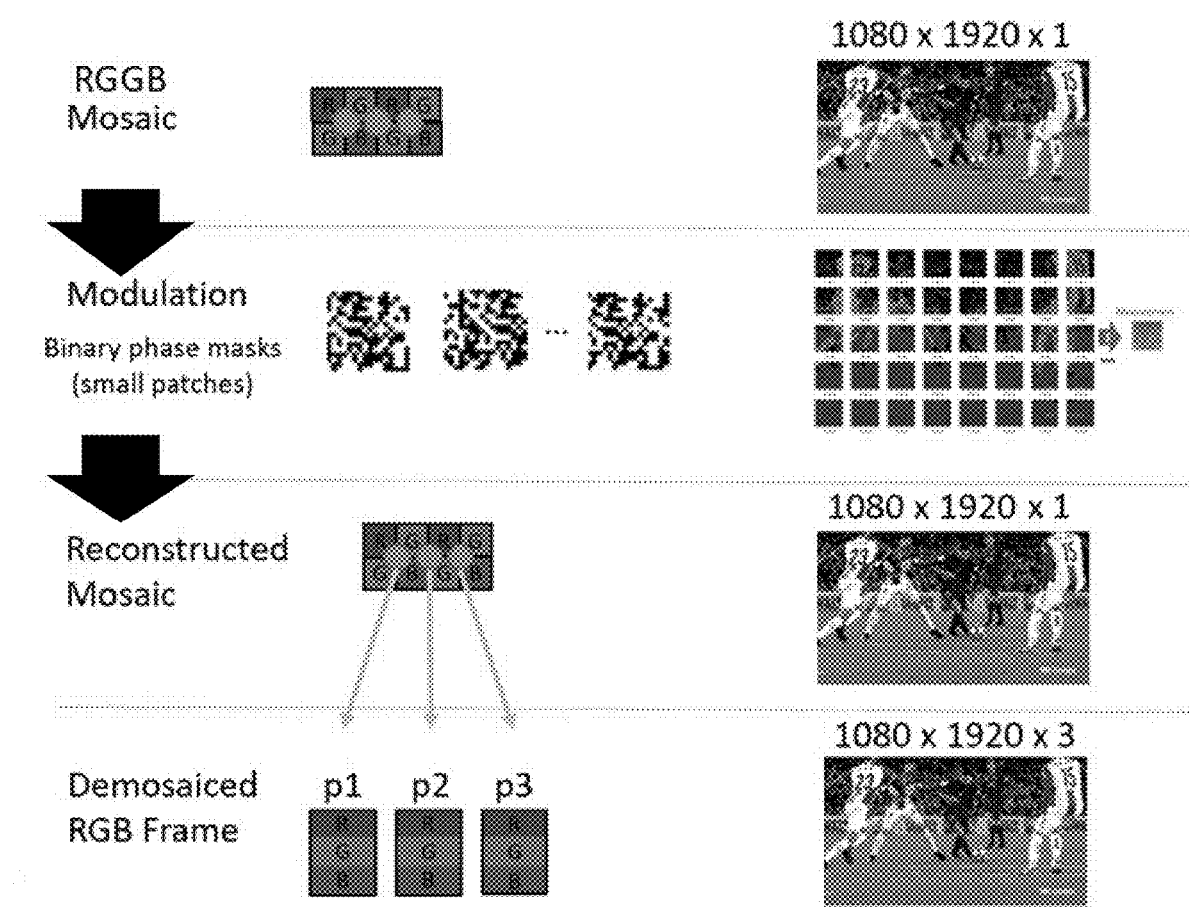
Figure 16B:
Figure 16A:
Figure 17:
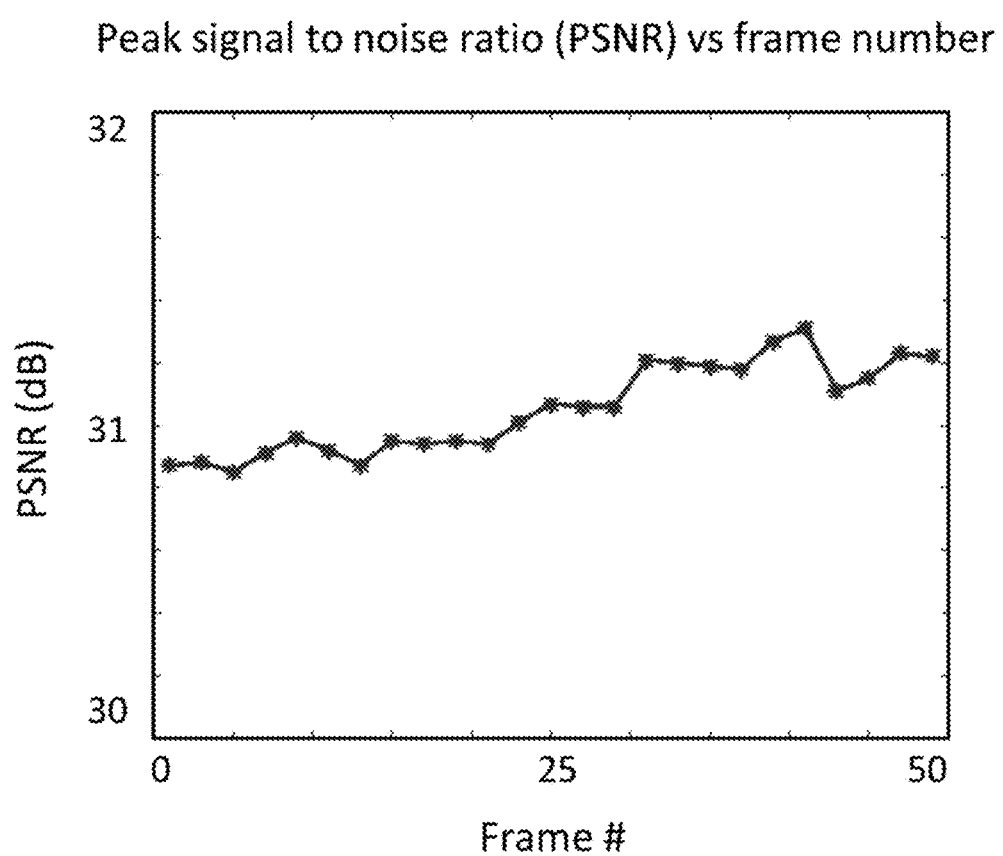
Figure 18:
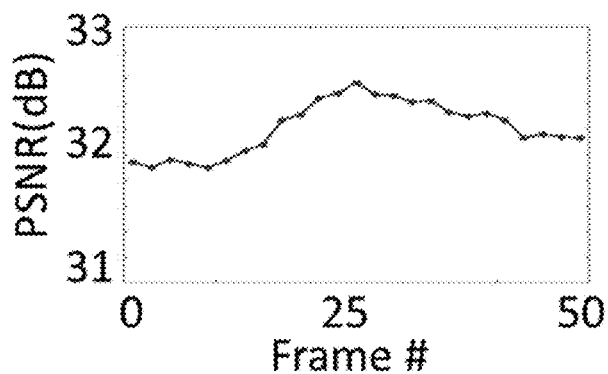
Figure 19:
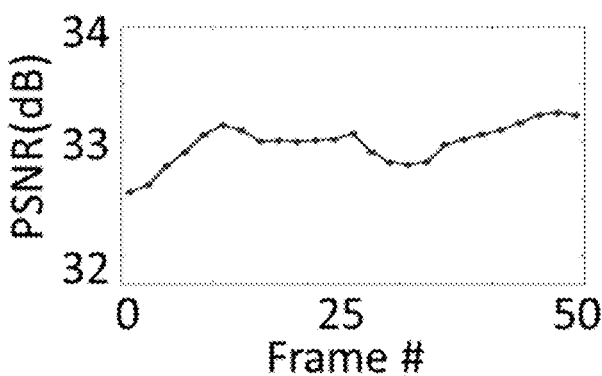
Figure 20:
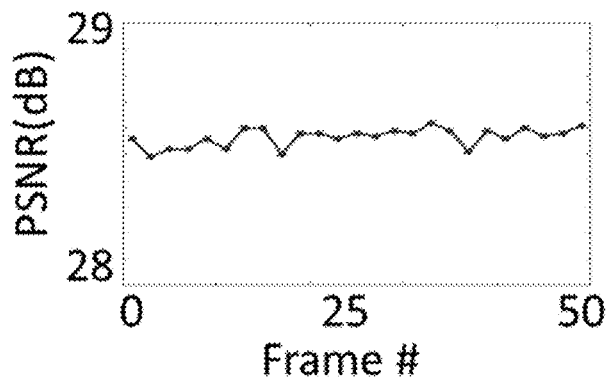
Figure 21:
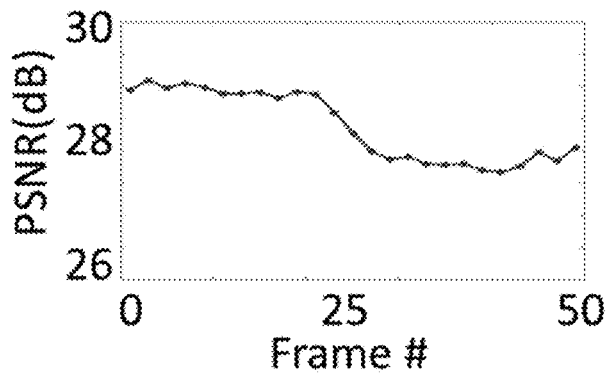
Figure 22:
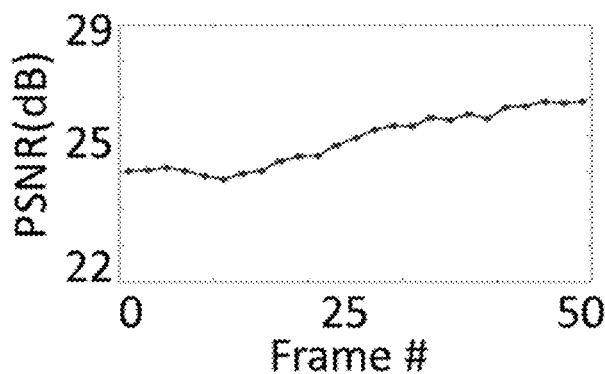
Figure 23:
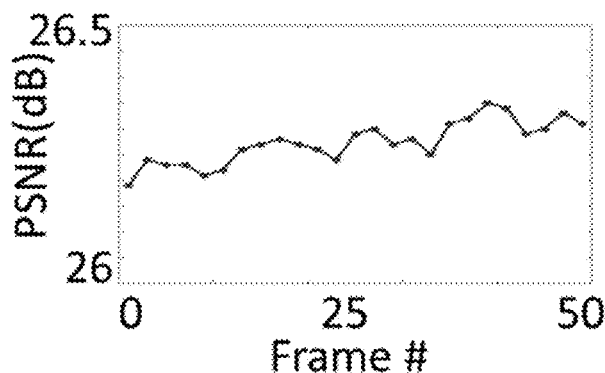
Figure 24:
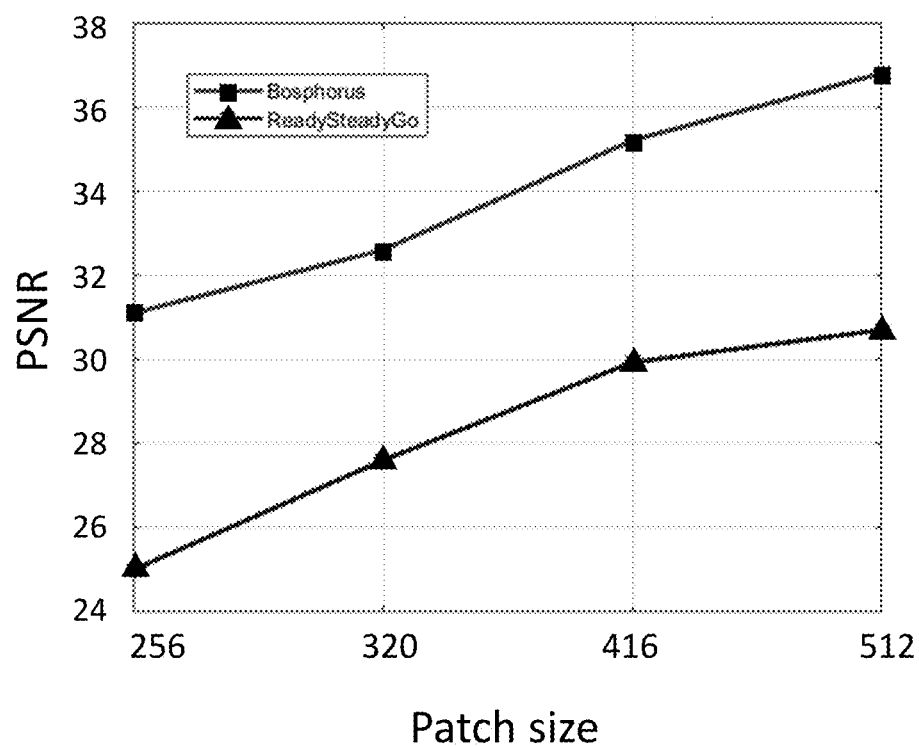
Figure 25:
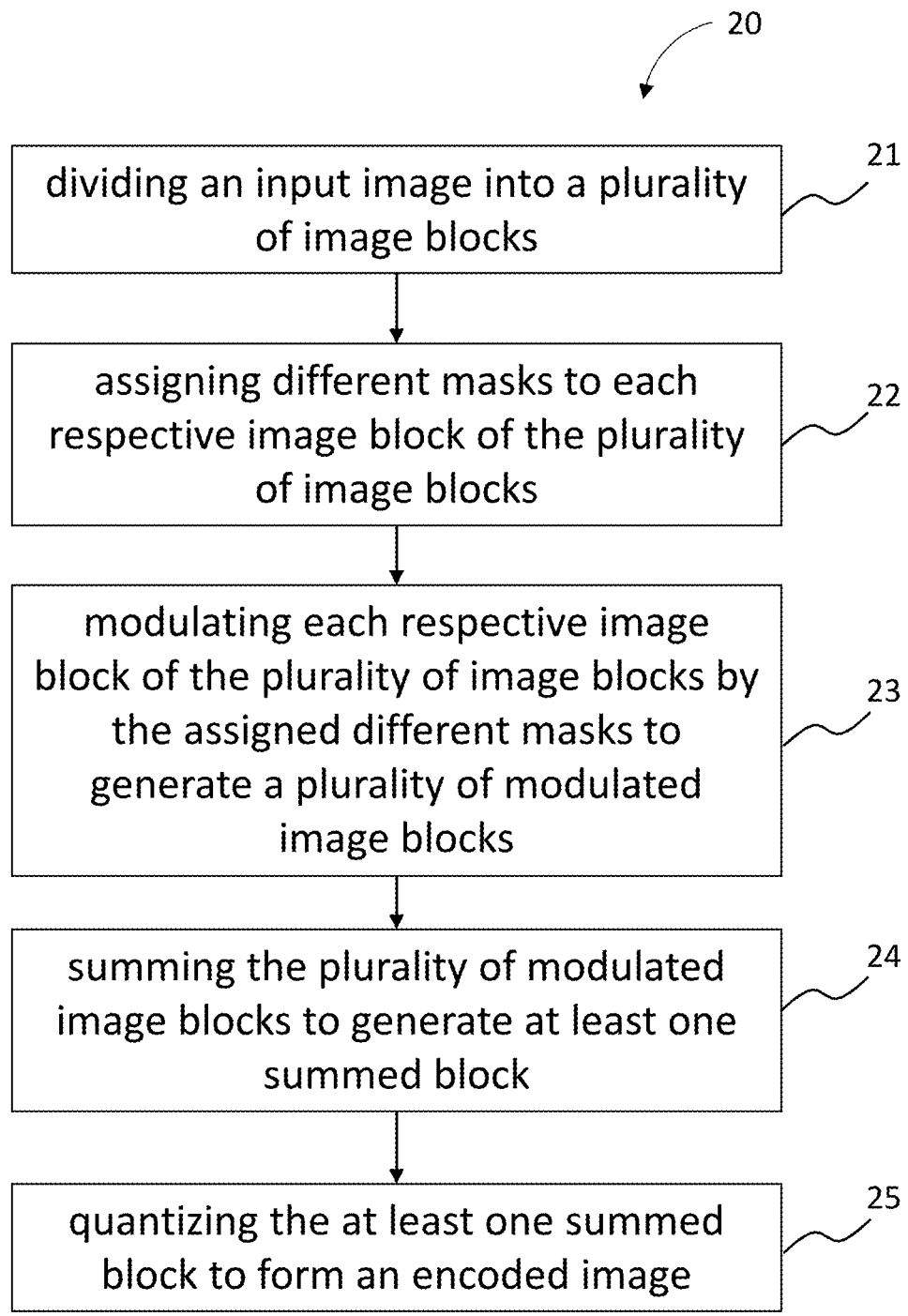
Figure 26:
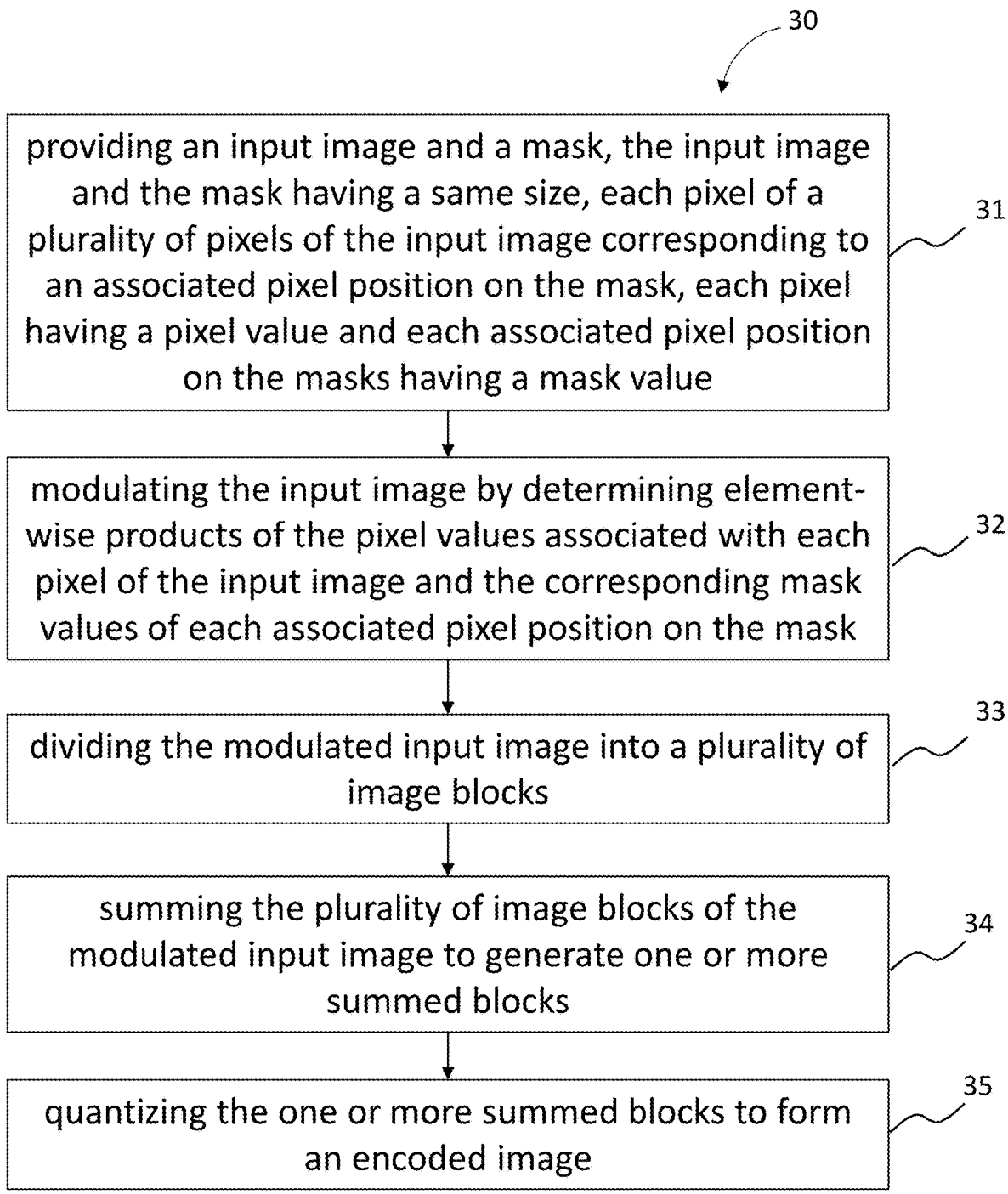

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment;

FIG. 2 illustrates an example process for block modulation video and image codec, in accordance with an example embodiment;

FIG. 3 illustrates an example process for block modulation video and image codec, in accordance with an example embodiment;

FIG. 4 is a flow diagram of an example process for block modulation video and image codec, in accordance with an example embodiment;

FIG. 5 illustrates an example process for decoding an image encoded according to block modulation video and image encoding, in accordance with an example embodiment;

FIG. 6A illustrates an example process for decoding an image encoded according to block modulation video and image encoding, in accordance with an example embodiment;

FIG. 6B illustrates an example process for decoding an image encoded according to block modulation video and image encoding, in accordance with an example embodiment;

FIG. 7 illustrates an example process for decoding an image encoded according to block modulation video and image encoding, in accordance with an example embodiment;

FIGS. 8A-8C illustrate an example of an encoding and decoding process, with FIG. 8A being an original input image, FIG. 8B being an summed, compressed block of the image after modulation of the image using a binary random mask, and FIG. 8C being a reconstruction of the input image using the summed, compressed block of the modulated image, in accordance with an example embodiment;

FIGS. 9A-9C illustrate an example of an encoding and decoding process, with FIG. 9A being an original input image, FIG. 9B being an summed, compressed block of the image after modulation of the image using a binary random mask, and FIG. 9C being a reconstruction of the input image using the summed, compressed block of the modulated image, in accordance with an example embodiment;

FIGS. 10A-10C illustrate an example of an encoding and decoding process on Y-channel, with FIG. 10A being an original input image, FIG. 10B being a summed, compressed block of the image after modulation of the image using a binary random mask, and FIG. 10C being a reconstruction of the input image using the summed, compressed block of the modulated image, in accordance with an example embodiment;

FIGS. 11A-11C illustrate an example of an encoding and decoding process on U-channel, with FIG. 11A being an original input image, FIG. 11B being an summed, compressed block of the image after modulation of the image using a binary random mask, and FIG. 11C being a reconstruction of the input image using the summed, compressed block of the modulated image, in accordance with an example embodiment;

FIGS. 12A-12C illustrate an example of an encoding and decoding process on V-channel, with FIG. 12A being an original input image, FIG. 12B being an summed, compressed block of the image after modulation of the image using a binary random mask, and FIG. 12C being a reconstruction of the input image using the summed, compressed block of the modulated image, in accordance with an example embodiment;

FIG. 13A illustrates an original bayer mosaic image encoded, in FIGS. 10A, 11A, and 12A on, respectively, on the Y, U, and V-channels, and FIG. 13B illustrates a reconstructed image from channel-specific images shown in FIGS. 10C, 11C, and 12C, in accordance with an example embodiment;

FIG. 14 illustrates a flow diagram of block modulating video and image compression of Bayer pattern data, in accordance with an example embodiment;

FIG. 15 is a flow diagram for block modulating video and image compression of Bayer pattern data, in accordance with an example embodiment;

FIG. 16A is an original image from a Bayer filter array, and FIG. 16B is an image formed from block modulation compressed Bayer pattern data including R, G1, G2, and B components, in accordance with an example embodiment;

FIG. 17 illustrates peak signal to noise ratio (PSNR) versus frame number for a video sequence that was encoded using a BMVC codec and decoded according to one of the algorithms discussed herein, in accordance with an example embodiment;

FIG. 18 illustrates PSNR versus frame number for a video sequence that was encoded using a BMVC codec and decoded according to one of the algorithms discussed herein, in accordance with an example embodiment;

FIG. 19 illustrates PSNR versus frame number for a video sequence that was encoded using a BMVC codec and decoded according to one of the algorithms discussed herein, in accordance with an example embodiment;

FIG. 20 illustrates PSNR versus frame number for a video sequence that was encoded using a BMVC codec and decoded according to one of the algorithms discussed herein, in accordance with an example embodiment;

FIG. 21 illustrates PSNR versus frame number for a video sequence that was encoded using a BMVC codec and decoded according to one of the algorithms discussed herein, in accordance with an example embodiment;

FIG. 22 illustrates PSNR versus frame number for a video sequence that was encoded using a BMVC codec and decoded according to one of the algorithms discussed herein, in accordance with an example embodiment;

FIG. 23 illustrates PSNR versus frame number for a video sequence that was encoded using a BMVC codec and decoded according to one of the algorithms discussed herein, in accordance with an example embodiment;

FIG. 24 illustrates PSNR versus patch size when using two different datasets, in accordance with an example embodiment;

FIG. 25 is a flow chart of a method for block modulating video and image compression, in accordance with an example embodiment; and FIG. 26 is a flow chart of a method for block modulating video and image compression, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

Additionally, as used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and 3rd Generation Partnership Project LTE (3GPP LTE).

As described herein, a method, apparatus and computer program product are provided for block modulating video and image compression (BMVC). In some embodiments, a BMVC codec, associated methods, and computer program products for carrying out the same are provided.

In order to carry out block modulating video and image compression, an apparatus 10 is provided as shown, for example, in FIG. 1. The apparatus may be embodied by or in communication with any of a variety of different types of computing devices including, for example, a video processing system, an image processing system or any other system configured to decompress images captured by a snapshot compressive sensing system. As shown in FIG. 1, the apparatus of an example embodiment includes, is associated with or is otherwise in communication with a processor 12, an associated memory 14 and a communication interface 16.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data, such as by receiving frames from a snapshot compressive sensing system or from an external memory device and/or for providing the reconstructed signal to an imaging system or other type of display for presentation or to an external memory device for storage. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The processor 12 may be configured to carry out instructions of a computer program by performing the arithmetical, logical, and input/output operations of the system. Instructions may be provided to the processor 12 by the memory 14.

Various interfaces of the device 10 may include components that interface the processor 12 with an antenna, or other input/output components. As will be understood, the interfaces and programs stored in the memory 14 to set forth the special purpose functionalities of the apparatus 10 will vary depending on the implementation of the apparatus 10.

In one example embodiment, the apparatus 10 may be any known or to be developed device including, but not limited to, a cellular phone, a laptop, a tablet, a personal computer, a portable media device such as a television set, a multifunctional camera, a drone, an electric vehicle, etc.

Video and image compression codecs are devices or computer programs that encode and/or de-code, e.g., a digital data stream, bitstream, sequence of pictures, a signal, or the like, related to video and/or images. Still image codecs can comport with standards such as JPEG, GIF, PNG, or the like. Video codecs can comport with standards such as Cinepak, MPEG, MPEG-2, H.264, VP8, H.265, or the like.

Existing image and video codecs may provide high-quality video but require high computation complexity and thus high power consumption. However, many mobile devices operate with limited computational capacity and/or limited power capacity (e.g., finite battery life). For these devices, existing codecs are typically ill suited. Instead, for many such mobile devices, the computational complexity of video and image compression is often accomplished by using increasingly lossy codecs, which results in material quality loss once decoded for playback.

In some embodiments, the codecs described herein may provide for a low-power encoder for image/video compression framework. In some embodiments, an example encoder can be implemented on mobile platforms with limited power and limited computational resources. Existing image/video codec are mainly based on MPEG, H.264, H.265, etc., which may provide high-quality video but require high computation complexity and thus high power consumption. However, currently, more and more mobile devices such as drones are running on battery. For such systems and devices, power consumption is often a major concern. As such, encoding an encoder that requires less computational resources, and which results in lower power consumption, can extend the running time of these mobile devices. As described herein, a block modulating video and image compression (BMVC) codec is provided that is an ultra-low complexity encoder. In some embodiments, the encoder complexity of an example BMVC codec may be $O(1)$. Conversely, the JPEG codec has an encoder complexity of $O(N \log N)$, where O is "on the order of" and N is the number of pixels in the image. As such, for a full high-definition 1080p image having a resolution of 1920 pixels by 1080 pixels, the total pixel count for the JPEG codec is 2,073,600 pixels, meaning the encoder complexity for purposes of encoding using the JPEG codec is on the order of $(2,073,600) \log (2,073,600)$, or on the order of about 13,098,360, whereas the complexity of encoding the same high-definition 1080p image according to the BMVC codec is on the order of about 1. As such, in some embodiments, the BMVC codec may be classified as a linear time algorithm or constant time algorithm, while JPEG and other conventional codecs for video and image compression may be classified as linearithmic time algorithms or the like. In some embodiments, the BMVC algorithm may be less complex because the computational complexity of encoding is moved to the decoder. In some embodiments, to move the codec complexity from the encoder to the decoder, one or more masks, e.g., random binary masks, can be used to modulate an input image, and the element-wise product can be summed to form a single compressed block. A mask may refer to a matrix of values associated with pixel positions of an input image. The mask may be the same size in terms of pixel height and pixel width, as the input image—or the mask may be smaller than the input image, e.g., when the input image will be divided into blocks where each block of the divided input image has a size that is equal to that of the mask(s). As described herein, "random" with regard to masks may refer to a particular mask used for modulation of a block of an input image having a pattern of pixel position values that is distinct and different from the pattern of pixel position values of any other mask used to modulate any other block of the same input image. When a video sequence of a plurality of input images or input frames are being encoded and decoded according to the BMVC approach(es) described herein, a same mask may be used to modulate blocks at the same block position for some or all of the images or frames in the sequence. Said otherwise, a block of the input image may be defined at an upper left corner of the input image, and a mask applied for purposes of modulating that block in a first image; for modulation of subsequent images, the same mask may be applied for purposes of modulating corresponding upper left corner blocks of the subsequent images also. In some embodiments, a single mask may be used to modulate the entire input image, and in those instances, the single mask may be used to modulate all images or frames in a sequence. Without wishing to be bound by any particular theory, by modulating blocks at the same block position for some or all images of a sequence using a single mask, or conversely modulating some or all full input images or frame of a sequence using the same mask, the encoder may transmit a smaller number of masks to the decoder as the 'key' for demodulating the blocks or images/frames, may reduce computational complexity at the encoder-side and also at the decoder-side, and may reduce bandwidth and storage requirements.

In some embodiments, modulation may refer to an element-wise product calculation (e.g., Hadamard product, Schur product, etc.) of a matrix of pixel values and a matrix of mask values at corresponding pixel positions on the mask.

In some embodiments, once modulated, the blocks of the input image/frame may be summed. In some embodiments, summing may refer to summing the element-wise product values generated from modulation of the blocks or input image. In some embodiments, summing may comprise adding all values from within a resulting matrix or index associated with a block or input image to determine a total value associated with that block or image. In some embodiments, summing may comprise adding single summed values from each block together to determine a single value, e.g., integer, decimal, etc., associated with the input image/frame. In some embodiments, an index of summed values associated with each block, a plurality of blocks, or the entire input image/frame may be provided with the mask(s) to the decoder to assist with demodulating the coded/compressed block.

In some embodiments, the compressed block (e.g., single compressed block) can be quantized (e.g., 8-bit or 12-bit) to form the encoded image, and data compression (e.g., arithmetic coding) can be used to form a bit stream. The bit stream can be transmitted towards the decoder. In some embodiments, an algorithm, such as a deep learning neural network, a convolutional neural network, a plug-and-play decoder with machine-learning denoising prior, an end-to-end deep neural network decoding algorithm, or the like can be used to decode and demodulate the compressed block for reconstruction of the input image. In some embodiments, the random binary mask(s) may be transmitted with the encoded image (or image bit stream) to be used as a key for demodulation of the compressed image by the decoder.

Referring now to FIG. 2, an example block modulating video/image compression (BMVC) encoding process 100 is illustrated. The input is an image 101, e.g., a large scale image, with size of $N_h \times N_w$ ($N_h$ rows and $N_w$ columns). In some embodiments, it may first be divided into blocks 102 with size of $B_h \times B_w$. Each block 102 may then be modulated 104 by a different binary random mask 103 with the same size. In some embodiments, these modulated blocks 105 may be summed 106 to a single block of size $B_h \times B_w$. In some embodiments, the summed values can then be quantized 107 (e.g., 8-bit or 12-bit depends on the use cases). After this, the data compression 108 may then be performed and the bit stream may be transmitted. In some embodiments, data compression may be via data compression algorithms such as arithmetic coding.

Referring now to FIG. 3, an example BMVC encoding process 200 is illustrated. In some embodiments, an input frame 201 may have a size of $N_h \times N_w$. In some embodiments, the input frame 201 may first be modulated by a mask 202 with the same size of $N_h \times N_w$. In some embodiments, the modulated frame 203 is then divided 204 into blocks 205 of size $B_h \times B_w$. In some embodiments, these modulated blocks 205 may then be summed 206 to a single block of size $B_h \times B_w$. In some embodiments, the summed values may then be quantized 207 (e.g., 8-bit or 12-bit depends on the use cases). In some embodiments, after quantizing, data compression 208 is performed and then a bit stream is transmitted.

In some embodiments, the mask may be used as a "key" or "basis" for decoding in BMVC, it may be easier to implement BMVC by, instead of having $N_b$ blocks different random binary mask of a small size $B_h \times B_w$, a single mask may be used that has the same size as the input image/frame $N_h \times N_w$.

According to some embodiments, the mask may be random such that, mathematically, the process illustrated in FIG. 2 and FIG. 3 may result in an equal or substantially equal modulation of the input image. According to some embodiments, since the random binary mask is being used, it is possible to only read out the pixel values corresponding to 1's in the mask, while the pixels corresponding to 0's are discarded in subsequent processing steps. In some embodiments, by disregarding the 0's in the mask(s), on-board memory, and thus power consumption, may be reduced.

Mathematical Model of Block Modulating Video/Image Compression (BMVC)

Let $X \in R^{N_h \times N_w}$ denote the input image (top-left in FIG. 2) and $M \in R^{N_h \times N_w}$ denote the binary mask shown in the bottom-left in FIG. 2.

The first step is to modulate the image frame by the mask. This gives:

$$\tilde{X} = X \odot M, \quad (1)$$

where $\odot$ denotes the element-wise product.

The second step is to divide the modulated image $\tilde{x}$ into blocks of size $\tilde{X}_b \in R^{B_h \times B_w}$, where $B_h < N_h, B_w < N_w$.

Consider that there are in total $N_b$ blocks:

$$\tilde{X}_b = X_b \odot M_b, \forall b=1, \ldots N_b \quad (2)$$

The block numbers can be calculated by:

$$N_b = \left\lceil \frac{N_h}{B_h} \right\rceil \left\lceil \frac{N_w}{B_w} \right\rceil \quad (3)$$

In some embodiments, there can be overlapping pixels in neighboring blocks. In order to reconstitute the original image or a high quality approximation of the original image, the indices of each block may be saved and then stitched together after being transmitted to the decoder or a device comprising or utilizing the decoder. Averaging the values in overlapping pixels can be used to achieve a more seamless transition between blocks upon stitching the blocks back together.

A third step may comprise summing all these blocks, such as:

$$Y = \sum_{b=1}^{N_b} \tilde{X}_b = \sum_{b=1}^{N_b} X_b \odot M_b,$$

Thus, $Y \in R^{B_h \times B_w}$ is the compressed measurement that may be sent to the receiver.

Before transmission, the quantization and entropy coding may be imposed to translate this compressed measurement to bit stream.

Flow-Chart and Pseudo-Code for BMVC Encoder

Referring now to FIG. 4, a flow-chart illustrates a method 200 and the functions used in the BMVC encoder. In some embodiments, pseudo code may be provided that refers to elements in FIG. 4. For instance, X_tilde=impose_mask(X, M); X_b=im2block(X_tilde, [Bh, Bw], block_index; Y=sum_block(X_b); Y_quant=quantization(Y); and Y_bitstream=AC_coding(Y_quant).

According to some embodiments:
X_tilde=impose_mask(X,M)
    X_tilde=zeros(size(X)); % initialization
    Ind=(M==1); % get the index of 1 elements, this can also pre-calculated X_tilde(Ind)=X(ind); % capture the value of the input image in is of the mask
return X_tilde
According to some embodiments:
X_b=im_2 block(X_tilde,[Bh, Bw], block_index, Nb) % block_index is the starting index
% top-left corner of each block
X_b=zeros(Bh,Bw,Nb); % initialization
For b=1:Nb % for loop for each block. This can be done in parallel using lookup table
X_b(1:Bh, 1:Bw,b)=X_tilde(block_index(1)+(0:(Bh−1)),
block_index(2)+(0:(Bw−1)))
End
return x_b
According to some embodiments:
Y=sum_block(X_b,Nb,[Bh,Bw])
Y=zeros(Bh,Bw); % initialization
For b=1:Nb
Y=Y+X_b(1:Bh,1:Bw,b);
End
According to some embodiments:
Y_quant=quantization(Y, Num_bit)
This function quantizes the Y to "Num_bit" positive integers.
According to some embodiments:
Y_bitstream=AC_coding(Y_quant)
This function performs arithmetic coding to the data Y_quant.

In some embodiments, the method 200 can include inputting image X, at 201 for encoding. The method 200 can further include selecting, generating, receiving, or otherwise providing one or more pre-defined masks M, at 202. The method 200 can further include imposing the mask on the input image to get $\tilde{X}$, at 203. In some embodiments, $\tilde{X}$ may refer to the element-wise product of the mask, e.g., a random binary mask, and the corresponding pixels of the input image X. In some embodiments, the method 200 can further comprise dividing the modulated image $\tilde{X}$ into blocks $\tilde{X}_b$, at 204, which may be determined based upon a predetermine block size $B_h \times B_w$, at 205. In some embodiments, the modulated image $\tilde{X}$ may be divided into a predetermined number of blocks 204 and the block size 205 may be determined therefrom. In some embodiments, the method 200 can further comprise summing the modulated blocks to a single block Y, at 206. In some embodiments, the method 200 can further comprise quantization of the summed modulated block (i.e., compressed block), at 207. In some embodiments, the method 200 can further comprise entropy coding the quantized compressed block, at 208. In some embodiments, the quantized compressed block (i.e., encoded image), may then be transmitted, at 209.

Decoding BMVC Encoded Images

Referring now to FIG. 5, a process 300 is illustrated for decoding an image encoded according to a BMVC approach, in which the encoded image 310 is decoded 320 to reconstitute the modulated blocks 322, and the modulated blocks are stitched back together to form a single modulated image 323. The modulated image may then be demodulated according to the mask to render a decoded version of the original input image.

In some embodiments, BMVC decoding 320 may use an algorithm such as a plug-and-play denoiser, a deep denoiser FFDNet algorithm, or the like. In some embodiments, the plug-and-play approach may use image/video denoisers as priors. Therefore, the plug-and-play approach may bridge the image/video processing community and the inverse problem community directly.

Referring now to FIGS. 6A and 6B, examples of algorithms usable for decoding images encoded according to the BMVC approach are illustrated, including, respectively, a plug-and-play algorithm and an end-to-end CNN algorithm.

In some embodiments, it is desirable to devise an efficient and flexible algorithm for compressed image reconstruction, especially for high-definition and ultra high-definition images and video.

In some embodiments, the plug-and-play (PnP) alternating direction method of multiplier (ADMM) framework can be used. In some embodiments, the PnP-GAP algorithm can use various bounded denoisers and may be integrated into a GAP, which has a lower computational workload than PnP-ADMM. In addition to the fixed point convergence, the PnP-GAP approach converges on a true signal.

In some embodiments, such as for the compression of color video, the raw data captured by, for instance, Bayer pattern sensors may have "RGGB" channels. Since the mask is imposed on each pixel or on blocks of a frame or image, the generated measurement can be treated as a grayscale image and when it is shown in color, a demosaicing procedure may not generate the right color due to mask modulation. Therefore, according to some embodiments, during reconstruction, each of these four channels may be reconstructed independently and demosaicing may then be perform in the reconstructed videos.

In some embodiments, algorithms or variations thereof may be used for decoding the compressed block of the input image, such as those disclosed in "Plug-and-Play Algorithms for Large-scale Snapshot Compressive Imaging," by Xin Yuan et al., "Deep Learning for Video Compressive Sensing, by Mu Qiao et al., International Patent Publication No. WO 2019/185992, entitled "Method and Apparatus for Reconstructing a Signal Captured by a Snapshot Compressive Sensing System," by Xin Yuan et al., U.S. Pat. No. 10,154,204, entitled "Video Compressive Sensing with Side Information," by Xin Yuan et al., and U.S. Pat. No. 10,200,605, entitled "Systems and Methods for Video Compressive Sensing Using a Rotating Disk," by Xin Yuan, the entire disclosures of each of which are hereby incorporated herein by reference in their entireties for all purposes.

Referring now to FIG. 7, an example decoding approach is presented in which GAP-FFDNet is used for denoising and demosaicing initialized images, which may require less iterations of the neural network. In some embodiments, the decoding algorithm may be used for interleaved bayer filter mosaics/RGGB blocks that are separately reconstructed channels that are demosaiced to reconstruct the image.

In some embodiments, processes for decoding a block modulation compressed video or image may comprise using a mask or masks, such as random binary masks, to demodulate the coded block according to an iterative algorithmic approach. In some embodiments, a GAP-FFDNet process or a E2E-DNN process may be used. In some embodiments, the decoded image blocks from GAP-FFDNet may be stitched back together to form a full reconstruction of the original image. In some embodiments, once the iterative algorithmic decoding process converges on a solution, the reconstructed image may be directly reconstructed based on the single random binary mask having a size equal to the size of the original input image.

Referring now to FIGS. 8A-8C, results of a coding-decoding simulation are presented. In FIG. 8A, the original image is presented, the original image being a frame from a video, the frame having a size of 1080×1920 pixels. FIG. 8B illustrates the compressed block having a size of 256×256 pixels, the compressed block being formed by modulating the original image by an associated mask. The compressed block was then decoded based upon the associated mask, and stitched back together to form a reconstruction of the original image, as illustrated in FIG. 8C. In addition to the reduction in encoding complexity associated with the block modulating video or image compression process, the reduced 256×256 pixel compressed block leads to reduced storage and transmission requirements.

Referring now to FIGS. 9A-9C, results of a coding-decoding simulation are presented. In FIG. 9A, the original image is presented, the original image being a frame from a video, the frame having a size of 1080×1920 pixels. FIG. 9B illustrates the compressed block having a size of 256×256 pixels, the compressed block being formed by modulating the original image by an associated mask. The compressed block was then decoded based upon the associated mask, and stitched back together to form a reconstruction of the original image, as illustrated in FIG. 9C. In addition to the reduction in encoding complexity associated with the block modulating video or image compression process, the reduced 256×256 pixel compressed block leads to reduced storage and transmission requirements.

Referring now to FIGS. 10A-13C, results of a coding-decoding simulation are presented. In FIG. 10A, the original image is presented from the Y channel, the original image being a frame from a color video, the frame having a size of 1080×1920 pixels. FIG. 10B illustrates the compressed block having a size of 256×256 pixels, the compressed block being formed by modulating the original image by an associated mask. As illustrated, the block modulating video compression of the original image was encoded in the Y channel. The compressed block was then decoded based upon the associated mask, and stitched back together to form a reconstruction of the original image, as illustrated in FIG. 10C. In addition to the reduction in encoding complexity associated with the block modulating video or image compression process, the reduced 256×256 pixel compressed block leads to reduced storage and transmission requirements.

In FIG. 11A, the original image is presented from the U channel, the original image being a frame from a color video, the frame having a size of 540×960 pixels. FIG. 11B illustrates the compressed block having a size of 128×128 pixels, the compressed block being formed by modulating the original image by an associated mask. As illustrated, the block modulating video compression of the original image was encoded in the U channel. The compressed block was then decoded based upon the associated mask, and stitched back together to form a reconstruction of the original image, as illustrated in FIG. 11C. In addition to the reduction in encoding complexity associated with the block modulating video or image compression process, the reduced 128×128 pixel compressed block leads to reduced storage and transmission requirements.

In FIG. 12A, the original image is presented from the V channel, the original image being a frame from a color video, the frame having a size of 540×960 pixels. FIG. 12B illustrates the compressed block having a size of 128×128 pixels, the compressed block being formed by modulating the original image by an associated mask. As illustrated, the block modulating video compression of the original image was encoded in the V channel. The compressed block was then decoded based upon the associated mask, and stitched back together to form a reconstruction of the original image, as illustrated in FIG. 12C. In addition to the reduction in encoding complexity associated with the block modulating video or image compression process, the reduced 128×128 pixel compressed block leads to reduced storage and transmission requirements.

In FIG. 13A, the original image elements from FIGS. 10A-12C are presented in composite. In FIG. 13B, the reconstructed image after separate BMVC of the color images on the Y, U, and V channels are combined is presented. The BMVC process for image encoding, according to one embodiment, resulted in a peak signal-to-noise ratio (PSNR) of 31.1 dB and a structural similarity index measure (SSIM) of 0.95.

In some embodiments, as illustrated in FIG. 14, a video sequence of images taken by a camera may be captured as a bayer filter mosaic (e.g., RGGB Bayer), that occupy a RGB color-space. Frames from the video sequence may be demosaiced to form Y, U, and V color-space channels. These channels may be separately encoded using a BMVC process, such as those described herein, to form an encoded image block for each channel, which can then be decoded after transmission to for each encoded image block for each channel, demasked, stitched together to form the channel-specific images, and then remosaiced to form a reconstituted RGGB Bayer image.

Referring now to FIG. 15, a process flow diagram is presented for a BMVC process for Bayer pattern data. In some embodiments, a RGGB mosaic having a size of 1080×1920×1 pixels is provided. The RGGB mosaic is modulated using binary phase masks (small patch masks) to form a dot matrix or index of binary values (1 or 0) associated with each pixel. In some embodiments, the RGGB mosaic can be divided into a plurality of blocks and the blocks can be modulated by element-wise product of pixel values and random binary mask values. The modulated image or modulated blocks of the image can be summed to form a single compressed block. In some embodiments, the RGGB mosaic can be reconstructed by demodulation and the various channels or layers of the image can be demosaiced to form the reconstructed color image.

Referring now to FIGS. 16A and 16B, an original image is provided that comprises Bayer pattern data. BMVC coding is carried out to compress the image to a compressed block size of 256×256 pixels. Then, a decoding algorithm, such as one of the algorithms described above, can be used to decode the compressed block using the one or more associated masks to demodulate and stitch together a reconstruction of the original image. As illustrated, the reconstructed image has a PSNR of 31.6 dB and a SSIM of 0.94.

Referring now to FIG. 17, a graph is presented of peak signal to noise ratio (PSNR) versus frame number for a fifty frame video sequence that was encoded according to a BMVC encoding approach, such as those described herein, and decoded to reconstitute each frame of the video sequence. Over the course of encoding and decoding the frames of the video sequence, the PSNR ranged between about 30.8 dB and about 31.2 dB.

Referring now to FIGS. 18-23, graphs are provided that illustrate the PSNR versus frame number for different fifty frame video sequences that were encoded according to a BMVC encoding approach, such as those described herein, and decoded to reconstitute each frame of the video sequence. Over the course of encoding and decoding the frames of the various video sequences, the PSNR across all the video sequences ranged between about 24.5 dB and about 33.25 dB, but the inter-video sequence variability was typically at or under about 2% of the average PSNR. One factor that led to differences in PSNR between different video sequences was the decoding algorithm used, however BMVC encoding typically did not contribute substantially to changes in PSNR.s Referring now to FIG. 24, a graph is provided that illustrates the change in PSNR as patch size increases between 256 and 512 when two different datasets are used for testing the BMVC codec, namely a Bosphorus dataset having a frame size of 1080×1920 pixels and comprising 10 bit YUV channel data, and a ReadySteadyGo dataset having a frame size of 1080×1920 pixels and comprising 10 bit YUV data. Other datasets, such as the Beauty dataset, Honeybee dataset, Jockey dataset, ShakeNDry dataset, YachtRide dataset, CityAlley dataset, FlowerFocus dataset, FlowerKids dataset, FlowerPan dataset, Lips dataset, RaceNight dataset, RiverBank dataset, SunBath dataset, and Twilight dataset were used to test the BMVC codec. These datasets were accessed from http://ultravideo.cs.tut.fi/#testsequences, the entire disclosures of which is hereby incorporated herein by reference in their entirety for all purposes. A discussion of these datasets can be found in "UVG dataset: 50/120 fps 4K sequences for video codec analysis and development," by A. Mercat, M. Viitanen, and J. Vanne, published in Proc. ACM Multimedia Syst. Conf., Istanbul, Turkey, June 2020, the entire disclosures of which is hereby incorporated herein by reference in their entirety for all purposes.

As can be seen from the graph of FIG. 24, increased patch size leads to increased PSNR. Without wishing to be bound by any particular theory, the graphical results presented in FIG. 24 may show that, for different datasets, the PSNR of the BMVC codec is different due at least in part to the content in the image or video sequence. Without wishing to be bound by any particular theory, when comparing within the same dataset, if the mask size is increased, meaning fewer blocks are summed up, the PSNR may be getting higher due to the compression rate being lower, e.g., more bits are being sent.

Referring now to FIG. 25, an apparatus comprising means, such as a processor and memory storing computer program instructions, can be provided for carrying out a method 20, the method comprising: dividing an input image into a plurality of image blocks, at block 21. The apparatus can further comprise means for: assigning different masks to each respective image block of the plurality of image blocks, at block 22. The apparatus can further comprise means for: modulating each respective image block of the plurality of image blocks by the assigned different masks to generate a plurality of modulated image blocks, at block 23. The apparatus can further comprise means for: summing the plurality of modulated image blocks to generate at least one summed block, at block 24. The apparatus can further comprise means for: quantizing the at least one summed block to form an encoded image, at block 25.

Referring now to FIG. 26, an apparatus comprising means, such as a processor and memory storing computer program instructions, can be provided for carrying out a method 30, the method comprising: providing an input image and a mask, the input image and the mask having a same size, each pixel of a plurality of pixels of the input image corresponding to an associated pixel position on the mask, each pixel having a pixel value and each associated pixel position on the masks having a mask value, at block 31. In some embodiments, the apparatus can further comprise means for: modulating the input image by determining element-wise products of the pixel values associated with each pixel of the input image and the corresponding mask values of each associated pixel position on the mask, at block 32. In some embodiments, the apparatus can further comprise means for: dividing the modulated input image into a plurality of image blocks, at block 33. In some embodiments, the apparatus can further comprise means for: summing the plurality of image blocks of the modulated input image to generate at least one summed block, at block 34. In some embodiments, the apparatus can further comprise means for: quantizing the at least one summed block to form an encoded image, at block 35.

As described above, FIGS. 1, 4, 25, and 26 are flowcharts of an apparatus (e.g., 10), method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry or a processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 1, 4, 25, and 26. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

Described herein are a method, apparatus and computer program product for block modulating video and image compression. According to some embodiments, different masks are imposed to different blocks of an image and then the blocks are summed to a small block, allowing for low-complexity image/video compression encoding that can be implemented on mobile platforms with limited power and limited computational resources.

In some embodiments, the apparatus may comprise a block modulating video and image compression (BMVC) encoder. In some embodiments, an encoder complexity of the BMVC encoder may be O(1).

According to an embodiment, a method can be carried out, e.g., by a processor and a memory storing computer program code. In some embodiments, the method can comprise: dividing an input image into a plurality of image blocks; assigning different masks to each respective image block of the plurality of image blocks, the different masks having a size equal to that of each respective image block of the plurality of image blocks; modulating each respective image block of the plurality of image blocks by the assigned different masks to generate a plurality of modulated image blocks; summing the plurality of modulated image blocks to generate at least one summed block; and quantizing the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the method can further comprise: entropy coding the encoded image to form a bit stream; and transmitting the bit stream.

In some embodiments, the method can further comprise: determining one or more pixels that overlap two or more blocks of the plurality of blocks; and averaging the respective indices of said two or more blocks.

In some embodiments, the method can further comprise: storing indices of each of said two or more blocks of the plurality of blocks to be transmitted with said encoded image.

In some embodiments, the modulating is carried out by determining an element-wise product of a pixel value and a mask value at each corresponding pixel position of the different mask associated with each respective image block of the input image.

In some embodiments, said summing may comprise summing the plurality of modulated image blocks to generate the one or more summed block while disregarding pixels having an element-wise product value of 0.

According to an embodiment, a method can be carried out, e.g., by a processor and a memory storing computer program code, the method comprising: providing an input image and a mask, the input image and the mask having a same size, each pixel of a plurality of pixels of the input image corresponding to an associated pixel position on the mask, each pixel having a pixel value and each associated pixel position on the masks having a mask value; modulating the input image by determining element-wise products of the pixel values associated with each pixel of the input image and the corresponding mask values of each associated pixel position on the mask; dividing the modulated input image into a plurality of image blocks, each image block of the plurality of image blocks corresponding to an associated element-wise product; summing the element-wise products of the pixel values and mask values associated with each image block of the plurality of image blocks to generate at least one summed block; and quantizing the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the method may further comprise: entropy coding the encoded image to form a bit stream; and transmitting the bit stream.

In some embodiments, the method may further comprise: determining one or more pixels that overlap two or more blocks of the plurality of blocks; and averaging the respective indices of said two or more blocks.

In some embodiments, the method may further comprise: storing indices of each of said two or more blocks of the plurality of blocks to be transmitted with said encoded image.

In some embodiments, said summing comprises summing the plurality of image blocks of the modulated input image to generate the one or more summed blocks while disregarding pixels having an element-wise product value of 0.

According to another embodiment, an apparatus can be provided that comprises a processor and a memory storing computer program instructions, wherein the processor is configured, with the memory storing computer program instructions, to: divide an input image into a plurality of image blocks; assign different masks to each respective image block of the plurality of image blocks, the different masks having a size equal to that of each respective image block of the plurality of image blocks; modulate each respective image block of the plurality of image blocks by the assigned different masks to generate a plurality of modulated image blocks; sum the plurality of modulated image blocks to generate at least one summed block; and quantize the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the processor is further configured, with the memory storing computer program instructions, to: entropy code the encoded image to form a bit stream; and transmit the bit stream.

In some embodiments, the processor is further configured, with the memory storing computer program instructions, to: determine one or more pixels that overlap two or more blocks of the plurality of blocks; and average the element-wise products of said two or more blocks for said one or more pixels.

In some embodiments, the processor is further configured, with the memory storing computer program instructions, to:

store indices of each of said two or more blocks of the plurality of blocks to be transmitted with said encoded image.

In some embodiments, the modulation is carried out by determining an element-wise product of a pixel value and a mask value at each corresponding pixel position of the different mask associated with each respective image block of the input image.

In some embodiments, the processor is further configured, with the memory storing computer program instructions, to: sum the plurality of modulated image blocks to generate the one or more summed block while disregarding pixels having an element-wise product value of 0.

In some embodiments, the apparatus comprises an encoder having an encoder complexity of O(1).

According to another embodiment, an apparatus can be provided that comprises a processor and a memory storing computer program instructions, wherein the processor is configured, with the memory storing computer program instructions, to: provide an input image and a mask, the input image and the mask having a same size, each pixel of a plurality of pixels of the input image corresponding to an associated pixel position on the mask, each pixel having a pixel value and each associated pixel position on the masks having a mask value; modulate the input image by determining element-wise products of the pixel values associated with each pixel of the input image and the corresponding mask values of each associated pixel position on the mask; divide the modulated input image into a plurality of image blocks, each image block of the plurality of image blocks corresponding to an associated element-wise product; sum the element-wise products of the pixel values and the mask values associated with each image block of the plurality of image blocks to generate at least one summed block; and quantize the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the processor is further configured, with the memory storing computer program instructions, to: entropy code the encoded image to form a bit stream; and transmit the bit stream.

In some embodiments, the processor is further configured, with the memory storing computer program instructions, to: determine one or more pixels that overlap two or more blocks of the plurality of blocks; and average the element-wise product of said two or more blocks.

In some embodiments, the processor is further configured, with the memory storing computer program instructions, to: store indices of each of said two or more blocks of the plurality of blocks to be transmitted with said encoded image.

In some embodiments, the processor is further configured, with the memory storing computer program instructions, to: sum the plurality of image blocks of the modulated input image to generate the one or more summed blocks while disregarding pixels having an element-wise product value of 0.

In some embodiments, the apparatus comprises an encoder having an encoder complexity of O(1).

According to some embodiments, an apparatus can be provided that comprises means, e.g., a processor and a memory storing computer program code, for dividing an input image into a plurality of image blocks; means for assigning different masks to each respective image block of the plurality of image blocks, the different masks having a size equal to that of each respective image block of the plurality of image blocks; means for modulating each respective image block of the plurality of image blocks by the assigned different masks to generate a plurality of modulated image blocks; means for summing the plurality of modulated image blocks to generate at least one summed block; and means for quantizing the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the apparatus can further comprise: means for entropy coding the encoded image to form a bit stream; and transmitting the bit stream.

In some embodiments, the apparatus can further comprise: means for determining one or more pixels that overlap two or more blocks of the plurality of blocks; and averaging the respective indices of said two or more blocks.

In some embodiments, the apparatus can further comprise: means for storing indices of each of said two or more blocks of the plurality of blocks to be transmitted with said encoded image.

In some embodiments, the means for modulating may comprise means for determining an element-wise product of a pixel value and a mask value at each corresponding pixel position of the different mask associated with each respective image block of the input image.

In some embodiments, said means for summing may comprise means for summing the plurality of modulated image blocks to generate the one or more summed block while disregarding pixels having an element-wise product value of 0.

According to an embodiment, an apparatus can be provided that comprises means, e.g., a processor and a memory storing computer program code, for providing an input image and a mask, the input image and the mask having a same size, each pixel of a plurality of pixels of the input image corresponding to an associated pixel position on the mask, each pixel having a pixel value and each associated pixel position on the masks having a mask value; means for modulating the input image by determining element-wise products of the pixel values associated with each pixel of the input image and the corresponding mask values of each associated pixel position on the mask; means for dividing the modulated input image into a plurality of image blocks, each image block of the plurality of image blocks corresponding to an associated element-wise product; means for summing the element-wise products of the pixel values and mask values associated with each image block of the plurality of image blocks to generate at least one summed block; and means for quantizing the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the apparatus may further comprise: means for entropy coding the encoded image to form a bit stream; and transmitting the bit stream.

In some embodiments, the apparatus may further comprise: means for determining one or more pixels that overlap two or more blocks of the plurality of blocks; and averaging the respective indices of said two or more blocks.

In some embodiments, the apparatus may further comprise: means for storing indices of each of said two or more blocks of the plurality of blocks to be transmitted with said encoded image.

In some embodiments, said means for summing may comprise means for summing the plurality of image blocks of the modulated input image to generate the one or more summed blocks while disregarding pixels having an element-wise product value of 0.

According to another embodiment, a computer program product comprising non-transitory computer readable media, may be provided that comprises computer-readable instructions to: divide an input image into a plurality of image blocks; assign different masks to each respective image block of the plurality of image blocks, the different masks having a size equal to that of each respective image block of the plurality of image blocks; modulate each respective image block of the plurality of image blocks by the assigned different masks to generate a plurality of modulated image blocks; sum the plurality of modulated image blocks to generate at least one summed block; and quantize the at least one summed block to form an encoded image.

In some embodiments, the different masks are binary random masks having either a 1 or a 0 associated with each pixel position. In some embodiments, the different masks are binary random masks when each mask of the different masks used to modulate the input image have a binary value pattern that is different from that of any other mask of the different masks used to modulate the input image.

In some embodiments, the different masks are grayscale masks having one of a plurality of different decimal values between 0 and 1 associated with each pixel position.

In some embodiments, the computer program product may further comprise computer-readable instructions to: entropy code the encoded image to form a bit stream; and transmit the bit stream.

In some embodiments, the computer program product may further comprise computer-readable instructions to: determine one or more pixels that overlap two or more blocks of the plurality of blocks; and average the element-wise products of said two or more blocks for said one or more pixels.

In some embodiments, the computer program product may further comprise computer-readable instructions to: store indices of each of said two or more blocks of the plurality of blocks to be transmitted with said encoded image.

In some embodiments, the modulation is carried out by determining an element-wise product of a pixel value and a mask value at each corresponding pixel position of the different mask associated with each respective image block of the input image.

In some embodiments, the computer program product may further comprise computer-readable instructions to: sum the plurality of modulated image blocks to generate the one or more summed block while disregarding pixels having an element-wise product value of 0.

According to another embodiment, a computer program product comprising non-transitory computer readable media, may be provided that comprises computer-readable instructions to: provide an input image and a mask, the input image and the mask having a same size, each pixel of a plurality of pixels of the input image corresponding to an associated pixel position on the mask, each pixel having a pixel value and each associated pixel position on the masks having a mask value; modulate the input image by determining element-wise products of the pixel values associated with each pixel of the input image and the corresponding mask values of each associated pixel position on the mask; divide the modulated input image into a plurality of image blocks, each image block of the plurality of image blocks corresponding to an associated element-wise product; sum the element-wise products of the pixel values and the mask values associated with each image block of the plurality of image blocks to generate at least one summed block; and quantize the at least one summed block to form an encoded image.

In some embodiments, the mask is a binary random mask having either a 1 or a 0 associated with each pixel position.

In some embodiments, the mask is a grayscale mask having one of a plurality of different decimal values between 0 and 1 associated with each pixel position.

In some embodiments, the computer program product may further comprise computer-readable instructions to: entropy code the encoded image to form a bit stream; and transmit the bit stream.

In some embodiments, the computer program product may further comprise computer-readable instructions to: determine one or more pixels that overlap two or more blocks of the plurality of blocks; and average the element-wise product of said two or more blocks.

In some embodiments, the computer program product may further comprise computer-readable instructions to: store indices of each of said two or more blocks of the plurality of blocks to be transmitted with said encoded image.

In some embodiments, the computer program product may further comprise computer-readable instructions to: sum the plurality of image blocks of the modulated input image to generate the one or more summed blocks while disregarding pixels having an element-wise product value of 0.

In some embodiments, a method can be carried out comprising: dividing an input image into a plurality of blocks; modulating the plurality of blocks by respective different binary random masks; summing the modulated plurality of blocks to one or more summed blocks; and quantizing the one or more summed blocks. In some embodiments, the method can further comprise data compressing the quantized one or more summed blocks to form a bit stream; and transmitting the bit stream.

In some embodiments, a method can be carried out that comprises dividing an input image into a plurality of image blocks; modulating each image block of the plurality of image blocks by determining element-wise products of pixels of each image block and a respective binary random mask; summing the plurality of modulated image blocks to generate one or more summed blocks; and quantizing the one or more summed blocks to form an encoded image.

In some embodiments, the method can further comprise entropy coding the encoded image to form a bit stream; and transmitting the bit stream.

In some embodiments, the method can further comprise determining one or more pixels that overlap two or more blocks of the plurality of blocks; and averaging the respective indices of said two or more blocks.

In some embodiments, the method can further comprise storing indices of each of said two or more blocks of the plurality of blocks to be transmitted with said encoded image.

In some embodiments, the element-wise products of the plurality of image blocks and the respective binary random masks comprise a 1 or a 0 for each pixel of the input image.

In some embodiments, said summing comprises summing the plurality of modulated image blocks to generate the one or more summed block while disregarding pixels having an element-wise product value of 0.

According to another embodiment, a method can be carried out that comprises: modulating an input image by determining an element-wise product of pixels of the input image and corresponding portions of a binary random mask, the binary random mask having dimensions equal to that of the input image; dividing the modulated input image into a plurality of image blocks; summing the plurality of image blocks of the modulated input image to generate one or more summed blocks; and quantizing the one or more summed blocks to form an encoded image.

In some embodiments, the method can further comprise entropy coding the encoded image to form a bit stream; and transmitting the bit stream.

In some embodiments, the method can further comprise determining one or more pixels that overlap two or more blocks of the plurality of blocks; and averaging the respective indices of said two or more blocks.

In some embodiments, the method can further comprise storing indices of each of said two or more blocks of the plurality of blocks to be transmitted with said encoded image.

In some embodiments, the element-wise product of the input image and the binary random mask comprises a 1 or a 0 for each pixel of the input image.

In some embodiments, said summing comprises summing the plurality of image blocks of the modulated input image to generate the one or more summed blocks while disregarding pixels having an element-wise product value of 0.

According to another embodiment, an apparatus can be provided that comprises a processor and a memory storing computer program instructions, wherein the processor is configured, with the memory storing computer program instructions, to: divide an input image into a plurality of image blocks; modulate each image block of the plurality of image blocks by determining element-wise products of pixels of each image block and a respective binary random mask; sum the plurality of modulated image blocks to generate one or more summed blocks; and quantize the one or more summed blocks to form an encoded image.

In some embodiments, the processor can be further configured, with the memory storing computer program instructions, to: entropy code the encoded image to form a bit stream; and transmit the bit stream.

In some embodiments, the processor can be further configured, with the memory storing computer program instructions, to: determine one or more pixels that overlap two or more blocks of the plurality of blocks; and average the element-wise products of said two or more blocks for said one or more pixels.

In some embodiments, the processor can be further configured, with the memory storing computer program instructions, to: store indices of each of said two or more blocks of the plurality of blocks to be transmitted with said encoded image.

In some embodiments, the element-wise products of the plurality of image blocks and the respective binary random masks comprise a 1 or a 0 for each pixel of the input image.

In some embodiments, the processor can be further configured, with the memory storing computer program instructions, to: sum the plurality of modulated image blocks to generate the one or more summed block while disregarding pixels having an element-wise product value of 0.

In some embodiments, the apparatus may comprise a block modulating video and image compression (BMVC) encoder. In some embodiments, an encoder complexity of the BMVC encoder may be O(1).

According to another embodiment, an apparatus can be provided that comprises a processor and a memory storing computer program instructions, wherein the processor is configured, with the memory storing computer program instructions, to: modulate an input image by determining an element-wise product of pixels of the input image and corresponding portions of a binary random mask, the binary random mask having dimensions equal to that of the input image; divide the modulated input image into a plurality of image blocks; sum the plurality of image blocks of the modulated input image to generate one or more summed blocks; and quantize the one or more summed blocks to form an encoded image.

In some embodiments, the processor may be further configured, with the memory storing computer program instructions, to: entropy code the encoded image to form a bit stream; and transmit the bit stream.

In some embodiments, the processor may be further configured, with the memory storing computer program instructions, to: determine one or more pixels that overlap two or more blocks of the plurality of blocks; and average the element-wise product of said two or more blocks.

In some embodiments, the processor may be further configured, with the memory storing computer program instructions, to: store indices of each of said two or more blocks of the plurality of blocks to be transmitted with said encoded image.

In some embodiments, the element-wise product of the input image and the binary random mask comprises a 1 or a 0 for each pixel of the input image.

In some embodiments, the processor may be further configured, with the memory storing computer program instructions, to: sum the plurality of image blocks of the modulated input image to generate the one or more summed blocks while disregarding pixels having an element-wise product value of 0.

In some embodiments, the apparatus may comprise a block modulating video and image compression (BMVC) encoder. In some embodiments, an encoder complexity of the BMVC encoder may be O(1).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
dividing an input image into a plurality of image blocks;
assigning different masks to each respective image block of the plurality of image blocks, the different masks having a size equal to that of each respective image block of the plurality of image blocks;
modulating each respective image block of the plurality of image blocks by the assigned different masks to generate a plurality of modulated image blocks;
summing the plurality of modulated image blocks to generate at least one summed block, wherein the at least one summed block and the plurality of modulated image blocks are of the same size; and
quantizing the at least one summed block to form an encoded image.

2. The method of claim 1, wherein the different masks are binary random masks having either a 1 or a 0 associated with each pixel position.

3. The method of claim 2, wherein the different masks are binary random masks when each mask of the different masks used to modulate the input image have a binary value pattern that is different from that of any other mask of the different masks used to modulate the input image.

4. The method of claim 1, wherein the different masks are grayscale masks having one of a plurality of different decimal values between 0 and 1 associated with each pixel position.

5. The method of claim 1, further comprising:
entropy coding the encoded image to form a bit stream; and
transmitting the bit stream.

6. The method of claim 1, further comprising:
determining one or more pixels that overlap two or more blocks of the plurality of blocks; and
averaging respective indices of said two or more blocks.

7. The method of claim 6, further comprising:
storing indices of each of said two or more blocks of the plurality of blocks to be transmitted with said encoded image.

8. The method of claim 1, wherein the modulating is carried out by determining an element-wise product of a pixel value and a mask value at each corresponding pixel position of the different mask associated with each respective image block of the input image.

9. The method of claim 2, wherein said summing comprises summing the plurality of modulated image blocks to generate the one or more summed block while disregarding pixels having an element-wise product value of 0.

10. An apparatus comprising a processor and a memory storing computer program instructions, wherein the processor is configured, with the memory storing computer program instructions, to:
divide an input image into a plurality of image blocks;
assign different masks to each respective image block of the plurality of image blocks, the different masks having a size equal to that of each respective image block of the plurality of image blocks;
modulate each respective image block of the plurality of image blocks by the assigned different masks to generate a plurality of modulated image blocks;
sum the plurality of modulated image blocks to generate at least one summed block, wherein the at least one summed block and the plurality of modulated image blocks are of the same size; and
quantize the at least one summed block to form an encoded image.

11. The apparatus of claim 10, wherein the different masks are binary random masks having either a 1 or a 0 associated with each pixel position.

12. The apparatus of claim 11, wherein the different masks are binary random masks when each mask of the different masks used to modulate the input image have a binary value pattern that is different from that of any other mask of the different masks used to modulate the input image.

13. The apparatus of claim 10, wherein the different masks are grayscale masks having one of a plurality of different decimal values between 0 and 1 associated with each pixel position.

14. The apparatus of claim 10, wherein the processor is further configured, with the memory storing computer program instructions, to:
entropy code the encoded image to form a bit stream; and
transmit the bit stream.

15. The apparatus of claim 10, wherein the processor is further configured, with the memory storing computer program instructions, to:
determine one or more pixels that overlap two or more blocks of the plurality of blocks; and
average element-wise products of said two or more blocks for said one or more pixels.

16. The apparatus of claim 15, wherein the processor is further configured, with the memory storing computer program instructions, to:
store indices of each of said two or more blocks of the plurality of blocks to be transmitted with said encoded image.

17. The apparatus of claim 10, wherein the modulation is carried out by determining an element-wise product of a pixel value and a mask value at each corresponding pixel position of the different mask associated with each respective image block of the input image.

18. The apparatus of claim 11, wherein the processor is further configured, with the memory storing computer program instructions, to:
sum the plurality of modulated image blocks to generate the one or more summed block while disregarding pixels having an element-wise product value of 0.

19. The apparatus of claim 10, wherein the apparatus comprises an encoder having an encoder complexity of O(1).

20. The method of claim 1, wherein summing the plurality of modulated image blocks to generate the at least one summed block comprises summing the plurality of modulated image blocks to generate a single summed block.

21. The apparatus of claim 10, wherein the processor is configured, with the memory storing computer program instructions, to sum the plurality of modulated image blocks to generate the at least one summed block by summing the plurality of modulated image blocks to generate a single summed block.

* * * * *